(12) United States Patent
Kang

(10) Patent No.: US 12,405,761 B2
(45) Date of Patent: Sep. 2, 2025

(54) ELECTRONIC DEVICE, AND METHOD FOR RECONSTRUCTING SCREEN USING EXTERNAL DEVICE

(71) Applicant: Samsung Electronics Co., Ltd., Suwon-si (KR)

(72) Inventor: Mingu Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 189 days.

(21) Appl. No.: 18/485,687

(22) Filed: Oct. 12, 2023

(65) Prior Publication Data

US 2024/0118857 A1  Apr. 11, 2024

Related U.S. Application Data

(63) Continuation of application No. PCT/KR2022/003389, filed on Mar. 10, 2022.

(30) Foreign Application Priority Data

Apr. 14, 2021 (KR) .......................... 10-2021-0048646

(51) Int. Cl.
*G06F 3/0482* (2013.01)
*G06F 3/0488* (2022.01)
(Continued)

(52) U.S. Cl.
CPC .......... *G06F 3/1454* (2013.01); *G06F 3/0482* (2013.01); *G06F 3/0488* (2013.01); *H04W 76/10* (2018.02)

(58) Field of Classification Search
CPC .... G06F 3/1454; G06F 3/0482; G06F 3/0488; H04W 76/10
See application file for complete search history.

(56) References Cited

U.S. PATENT DOCUMENTS 8,661,350 B2   2/2014   Kim et al.
9,661,375 B2   5/2017   Kim
(Continued)

FOREIGN PATENT DOCUMENTS

KR          10-0858149 B1    9/2008
KR       10-2012-0017021 A   2/2012
(Continued)

OTHER PUBLICATIONS

Alexander Kroner et al., A Framework for Ubiquitous Content Sharing, Oct. 1, 2009, IEEE Pervasive Computing, pp. 58-65 (Year: 2009).*

(Continued)

*Primary Examiner* — Tam T Tran
(74) *Attorney, Agent, or Firm* — Jefferson IP Law, LLP

(57) ABSTRACT

An electronic device is provided. The electronic device includes a display, a communication module, a memory, and at least one processor operatively connected to the display, the communication module, and the memory, wherein the at least one processor is configured to acquire device information of an external device by using the communication module, based on the device information, determine at least one item to be transmitted to the external device from among items displayed in an application being executed on the electronic device, generate view data of the external device, the view data including information on the determined item, and establish a communication connection with the external device so as to transmit view data for transmission.

20 Claims, 17 Drawing Sheets

(51) Int. Cl.
*G06F 3/14* (2006.01)
*H04W 76/10* (2018.01)

(56) References Cited

U.S. PATENT DOCUMENTS

| | | | |
|---|---|---|---|
| 9,940,088 B2 | 4/2018 | Park | |
| 10,403,235 B2 | 9/2019 | Miao et al. | |
| 11,435,876 B1* | 9/2022 | Kakati | G06F 9/451 |
| 2007/0045561 A1 | 3/2007 | Cooper | |
| 2013/0016040 A1 | 1/2013 | Ahn et al. | |
| 2013/0278484 A1 | 10/2013 | Hwang et al. | |
| 2015/0061968 A1 | 3/2015 | Park et al. | |
| 2016/0080475 A1 | 3/2016 | Singh et al. | |
| 2016/0202943 A1 | 7/2016 | Choi et al. | |
| 2017/0011010 A1 | 1/2017 | Eom et al. | |
| 2021/0152879 A1* | 5/2021 | Choi | H04N 21/4126 |
| 2022/0248187 A1* | 8/2022 | Reese | H04L 51/046 |
| 2022/0350564 A1* | 11/2022 | Cao | G06F 3/1454 |

FOREIGN PATENT DOCUMENTS

| | | |
|---|---|---|
| KR | 10-2013-0040068 A | 4/2013 |
| KR | 10-2015-0026773 A | 3/2015 |
| KR | 10-2015-0038883 A | 4/2015 |
| KR | 10-2015-0072766 A | 6/2015 |
| KR | 10-2015-0087733 A | 7/2015 |
| KR | 10-2016-0087644 A | 7/2016 |
| KR | 10-2017-0006432 A | 1/2017 |

OTHER PUBLICATIONS

Jiyun Park et al., A Transparent Contents Sharing Service with Virtual Media Server, Nov. 1, 2007, International Conference on Convergence Information Technology, pp. 764-767 (Year: 2007).*
International Search Report dated Jun. 22, 2022, issued in International Patent Application No. PCT/KR2022/003389.

* cited by examiner

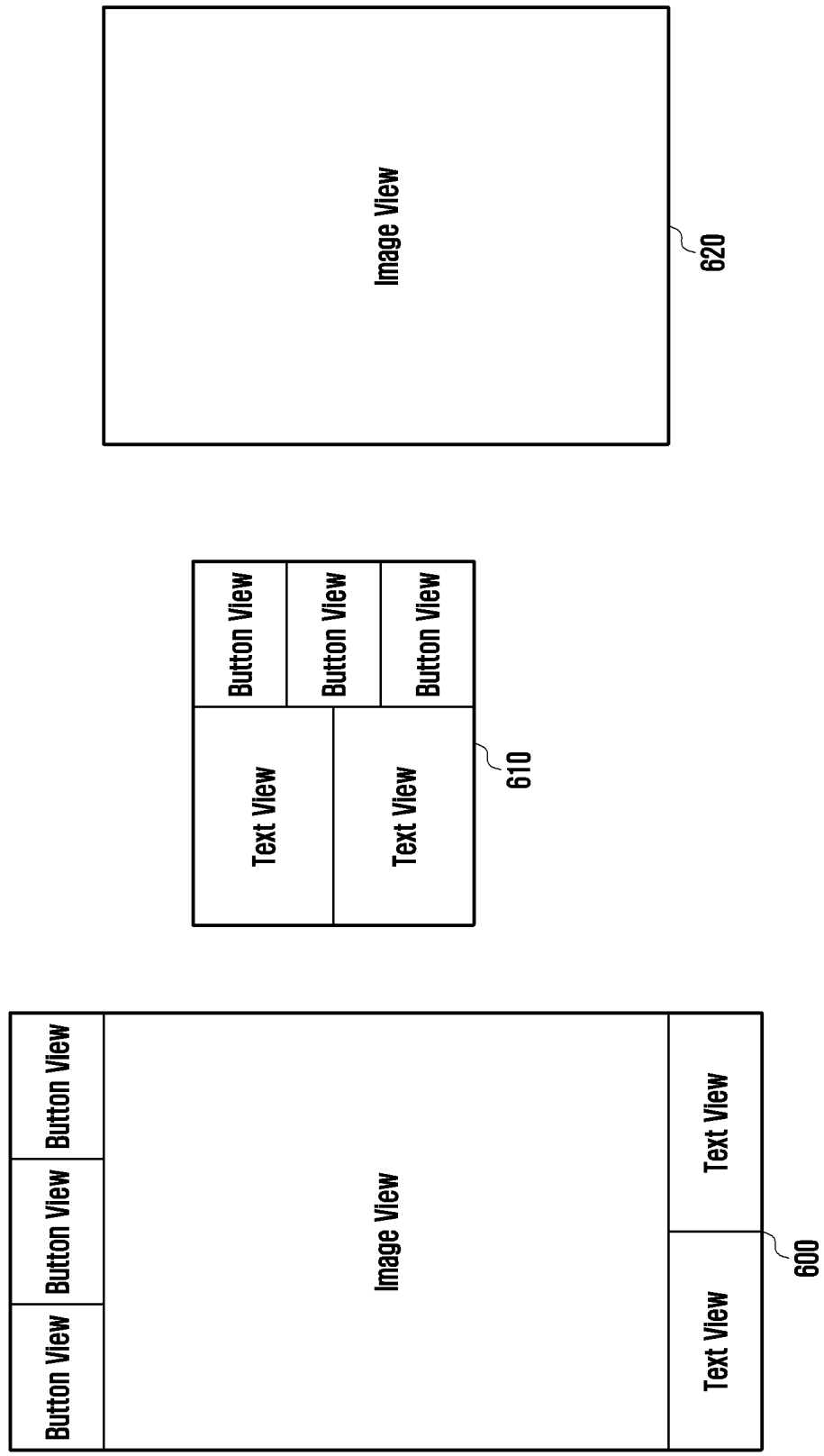

FIG. 9
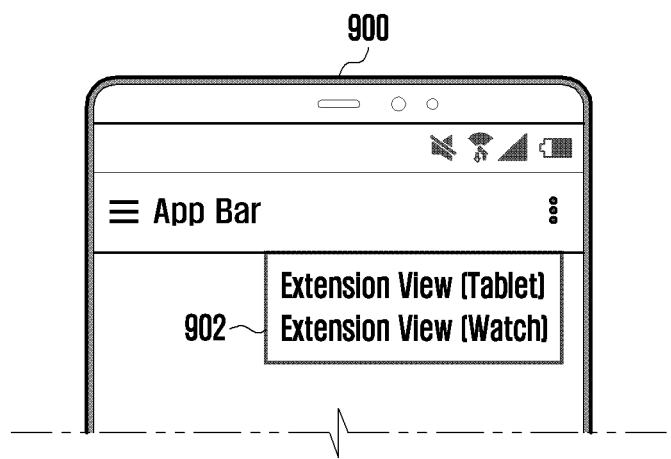
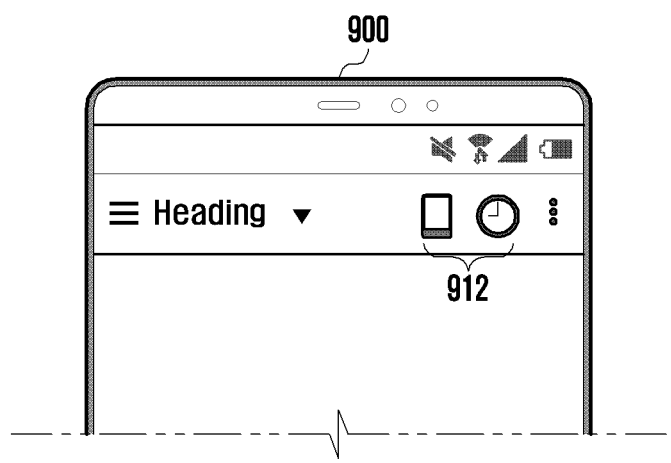

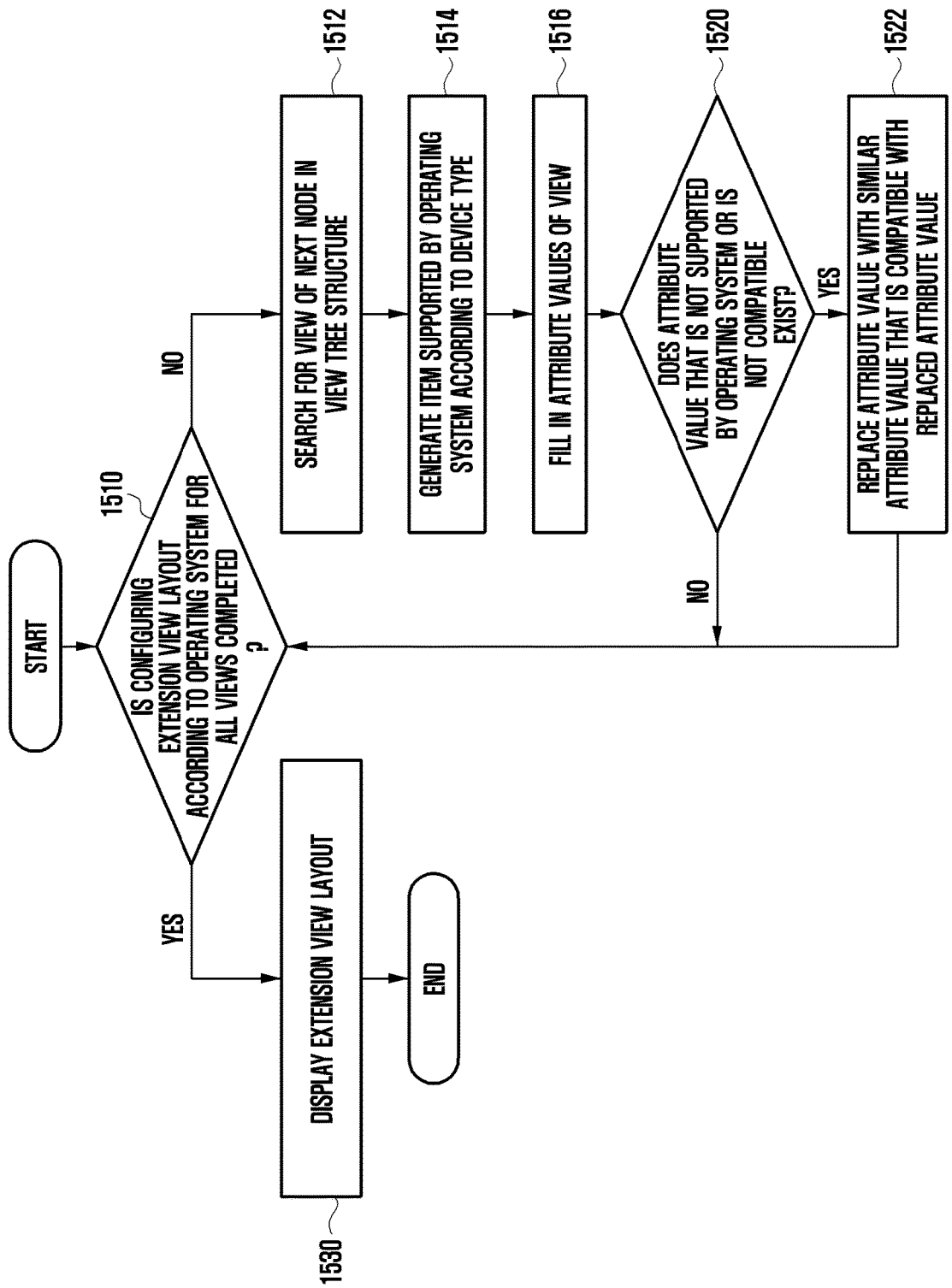

ELECTRONIC DEVICE, AND METHOD FOR RECONSTRUCTING SCREEN USING EXTERNAL DEVICE

CROSS-REFERENCE TO RELATED APPLICATION(S)

This application is a continuation application, claiming priority under § 365(c), of an International application No. PCT/KR2022/003389, filed on Mar. 10, 2022, which is based on and claims the benefit of a Korean patent application number 10-2021-0048646, filed on Apr. 14, 2021, in the Korean Intellectual Property Office, the disclosure of which is incorporated by reference herein in its entirety.

BACKGROUND

1. Field

The disclosure relates to an electronic device. More particularly, the disclosure relates to a method for reconfiguring a screen displayed on a display of an electronic device by using an external device.

2. Description of Related Art

Recent electronic devices may be equipped with various functions due to the development of hardware/processor technology. For example, electronic devices may transmit files and play videos using various applications, and may share content with external devices.

A user may execute various applications in an electronic device, and a user interface (UI) for user convenience is provided for each application. For example, a user interface suitable for a display of a smartphone, a tablet personal computer (PC), a smartwatch, or a desktop personal computer may be provided.

The above information is presented as background information only to assist with an understanding of the disclosure. No determination has been made, and no assertion is made, as to whether any of the above might be applicable as prior art with regard to the disclosure.

SUMMARY

Electronic devices of the related art may use neighboring electronic devices having screens to display information on a larger screen or connected electronic devices may simultaneously perform multiple tasks by executing distinct applications. However, because the applications cannot directly control and interact with the screens of neighboring electronic devices, the application cannot actively utilize the neighboring electronic devices to configure a user interface.

Aspects of the disclosure are to address at least the above-mentioned problems and/or disadvantages and to provide at least the advantages described below. Accordingly, an aspect of the disclosure is to provide a method for an application to directly control the screen of an external device and reconfigure the screen, when the electronic device reconfigures the application screen by using the screen of the external device as described above.

Additional aspects will be set forth in part in the description which follows and, in part, will be apparent from the description, or may be learned by practice of the presented embodiments.

In accordance with an aspect of the disclosure, an electronic device is provided. The electronic device includes a display, a communication module, a memory, and at least one processor operatively connected to the display, the communication module, and the memory, and the at least one processor obtains device information of an external device by using the communication module, determine at least one item to be transmitted to the external device from among items displayed in an application being executed on the electronic device based on the device information, generate view data of the external device including information on the at least one item, and establish a communication connection with the external device so as to transmit view data for transmission.

In accordance with another aspect of the disclosure, an electronic device is provided. The electronic device includes a display, a communication module, a memory, and at least one processor operatively connected to the display, the communication module, and the memory, and the at least one processor receives view event information from an external device, modify view data based on received view event information, and change the modified view data into view data for transmission to transmit the modified view data to the external device.

In accordance with another aspect of the disclosure, a method for utilizing an external device display of an electronic device is provided. The method includes obtaining device information of the external device by establishing a communication connection with an external device by using a communication module, determining at least one item to be transmitted to the external device among items displayed in an application being executed on the electronic device, based on the device information, generating view data of the external device including information on the at least one item, and transmitting view data for transmission to the external device.

According to various embodiments of the disclosure, a user reconfigures an application execution screen by using a display of an external device. The application actively utilizes the screen of the external device by recognizing an external device existing in the neighborhood and transmitting a part of the execution screen through a communication connection.

In addition, because the application execution screen is reconfigured according to the user's intention, it is possible to provide a customized screen for each user for each application.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 6A and 6B are diagrams illustrating an existing view layout, an extension view layout, and a modified view layout according to various embodiments of the disclosure;

FIG. 9 is a diagram illustrating a menu indicating an external device that may be connected to an extension view according to an embodiment of the disclosure;

FIG. 15 is a flowchart illustrating an operation of generating and displaying an extension view layout by an external device based on view data according to an embodiment of the disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
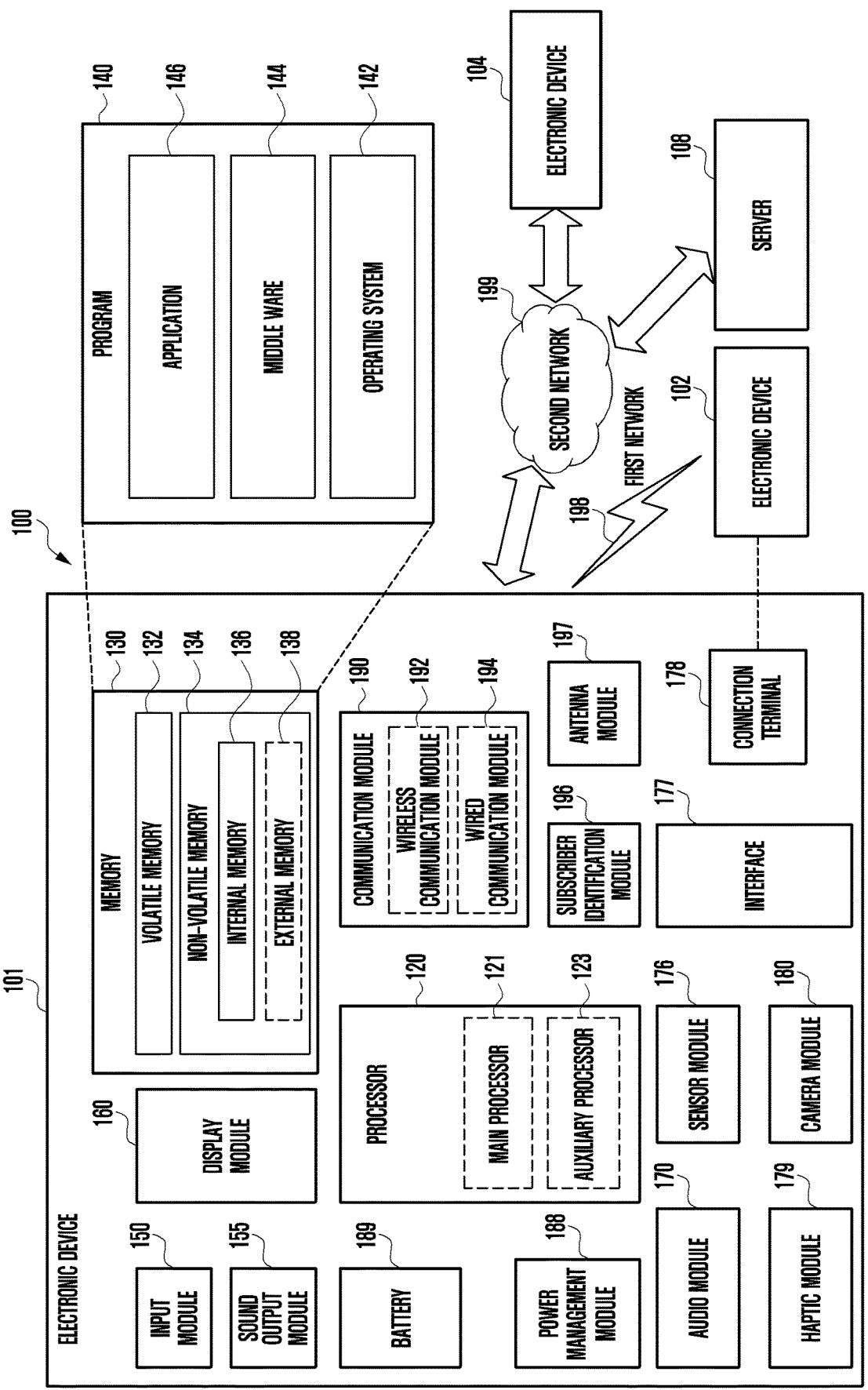
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the 11 connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as the memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
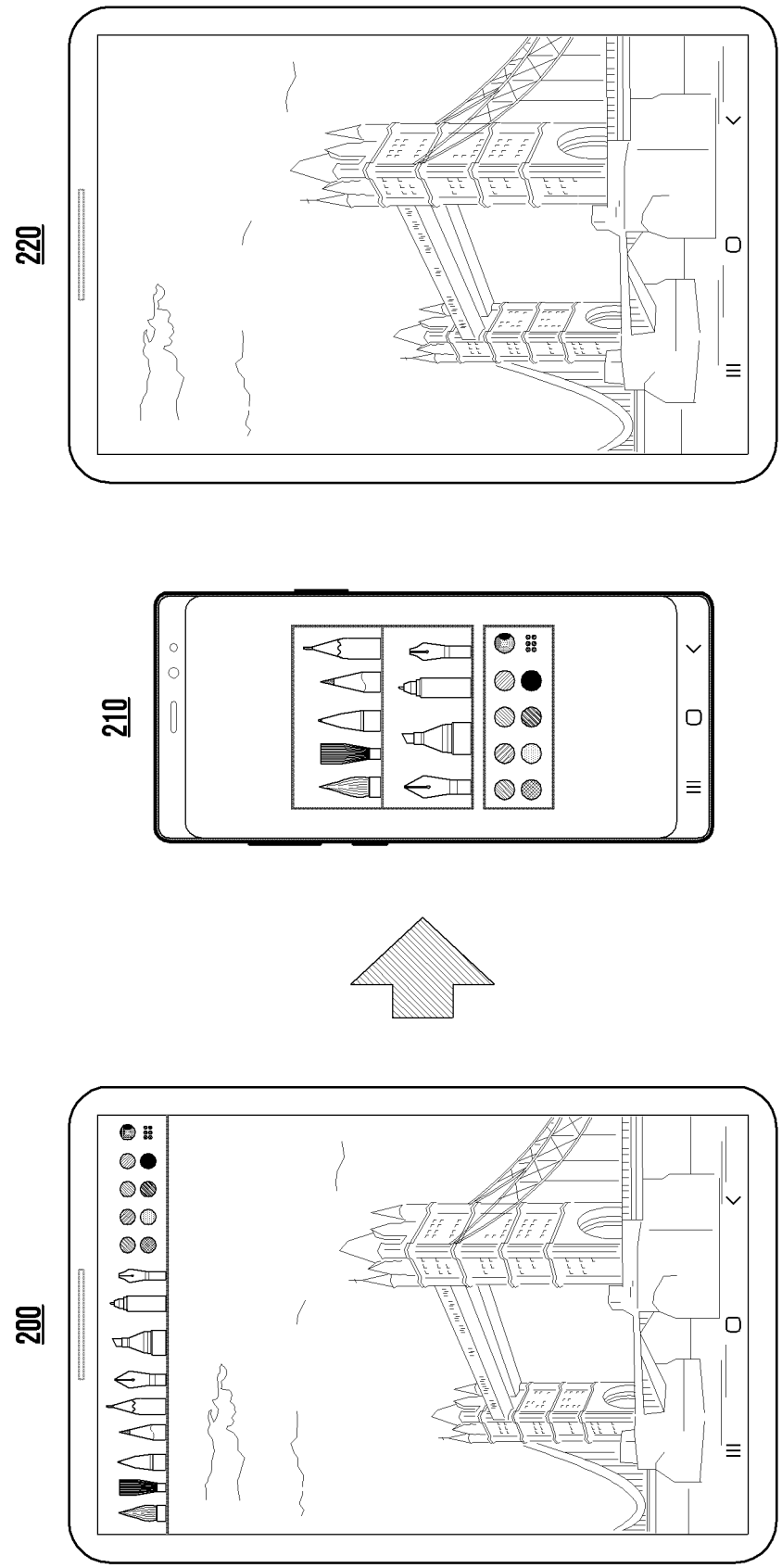
FIG. 2 is a diagram illustrating screen reconfiguration of an electronic device using an external device according to an embodiment of the disclosure.

FIG. 2 is a diagram illustrating screen reconfiguration of an electronic device using an external device according to an embodiment of the disclosure.

Referring to FIG. 2, according to various embodiments of the disclosure, a processor may display an application execution screen on the display of an electronic device 200. At least one item may be displayed on the application execution screen, and a predetermined function may be performed based on a user input. For example, when a drawing application is executed, the electronic device 200 may execute a drawing function based on the user input. The drawing application execution screen may include at least one of canvas and brush tool windows. The processor may configure an existing view layout by arranging each item according to application configurations or user configurations. The processor may display the existing view layout on the display, and the user may use the application on the existing view layout.

According to various embodiments of the disclosure, the processor may transmit a part of the application execution screen to an external device 210. According to an embodiment of the disclosure, the processor may determine an item to be transmitted to the external device 210 according to an application configuration, and generate view data based on the determined item. According to another embodiment of the disclosure, the processor may determine an item to be transmitted to the external device 210 based on a user input. For example, in the above example, when the user wants to transmit the brush tool window to the external device 210, the processor may determine to transmit the corresponding item to the external device 210 based on the user input and generate view data. According to an embodiment of the disclosure, the processor may store view data in a tree structure.

According to various embodiments of the disclosure, the processor may generate a view layout based on generated view data. According to an embodiment of the disclosure, the processor may generate an extension view layout to be displayed on the external device 210. The processor may determine an item to be transmitted to the external device 210 based on at least one of an application configuration and a user configuration and determine how to arrange the corresponding item to generate the extension view layout. According to an embodiment of the disclosure, the processor may generate a modified view layout to be displayed on the electronic device 200. The processor may generate and transmit view data including information on the extension view layout to the external device 210 and configure the display of an electronic device 220 according to the modified view layout. According to an embodiment of the disclosure, the processor may convert view data generated to transmit view data to the external device 210 into view data for transmission. The processor may transmit view data for transmission to the external device 210.

According to various embodiments of the disclosure, the processor may determine the external device 210 connectable to the extension view according to a filter condition for each item. The filter condition may include at least one of device type, screen size, whether only devices with the same account are supported, whether a pen is supported, and operating system information. The processor may determine an external device that satisfies the filter condition among external devices connectable through communication as the external device 210 connectable to the extension view.

According to various embodiments of the disclosure, the processor may establish a wireless communication connection (e.g., Bluetooth (BT) or Bluetooth low energy (BLE)) with at least one external device 210. According to an embodiment of the disclosure, the processor may perform a wireless communication scan when at least one of entering a view selection mode, logging into an account, or changing a status of the electronic device 200 occurs. A scan filter (e.g., a BLE media access control (MAC) address, a service identification (ID), a manufacturing ID) may be configured by using the wireless communication scan to search only the external device 210 that meets desired conditions. The electronic device 200 and the external device 210 may efficiently use the battery by adjusting the scan range based on current device conditions, such as screen on/off and remaining battery power. According to an embodiment of the disclosure, the processor may stop scanning when a desired external device 210 is found.

According to various embodiments of the disclosure, the processor may search for the external device 210 that meets filter conditions through data broadcasting (e.g., BLE advertisement). According to an embodiment of the disclosure, the processor may transmit a BLE packet (BLE advertisement packet) including information on filter conditions. The BLE packet may include at least one of service ID, manufacturing ID, account information, device status information, network status information, device type, screen size, whether a pen is supported, and operating system information.

According to various embodiments of the disclosure, the processor may establish a wireless communication connection (e.g., BT, BLE, Wi-Fi, Wi-Fi peer-to-peer (P2P), Mobile Network, secure source layer (SSL)) with the external device 210 by performing a wireless communication scan and data broadcasting. The external device 210 and the electronic device 200 may transmit and receive data by using BLE packets. According to an embodiment of the disclosure, when a wireless communication connection has already been established for another purpose, data may be transmitted and received by using the existing communication connection without the need to establish a new communication connection.

According to various embodiments of the disclosure, the processor may display the external device 210 determined as an external device connectable to the extension view on one side of the display. According to an embodiment of the disclosure, the processor may provide at least one of a graphic object indicating external devices connectable to the extension view and a list of connectable external devices. The processor may determine the external device 210 to establish an extension view connection based on a user input for at least one of the graphic object and the list.

According to various embodiments of the disclosure, the processor may determine whether account information of the electronic device 200 and the external device 210 match. When the account information of the electronic device 200 and the external device 210 match, the processor may establish an extension view connection between the corresponding external device 210 and the electronic device 200 without a separate process. When the account information of the electronic device 200 and the external device 210 do not match, the processor may display a pop-up message requesting acceptance of the extension view connection on the display. The processor may determine whether to establish the extension view connection with the external device 210 based on a user input for the pop-up message.

According to various embodiments of the disclosure, the external device 210 may generate view event information based on a user input. When a user touches an item transmitted to the external device 210, the external device 210 may receive the item and generate view event information. For example, the view event information may include at least one operation of a user's touch input, drag, and press on a button. According to an embodiment of the disclosure, the external device 210 may transmit generated view event information to the electronic device 220.

According to various embodiments of the disclosure, the processor may reconfigure view data to be transmitted to the external device 210 into view data for transmission. According to an embodiment of the disclosure, at least part of the data included in the view data may be unnecessary or incompatible data on the operating system or platform of the external device 210. When the attribute is unnecessary in the operating system of the external device 210, the processor may remove the attribute, or when the attribute is incompatible, the processor may change the attribute to other similar attribute values.

According to various embodiments of the disclosure, the processor may modify view data based on received view event information. According to an embodiment of the disclosure, the processor may determine whether modification is required for view data transmitted to the external device 210 based on view event information. The processor may modify view data when a change is required in the extension view layout displayed on the external device 210 and the modified view layout displayed on the electronic device 220. The processor may retransmit the modified view data to the external device 210. According to an embodiment of the disclosure, the processor may convert the modified view data into view data for transmission in order to transmit the modified view data to the external device 210.

According to various embodiments of the disclosure, the processor may transmit control data to the external device 210. According to an embodiment of the disclosure, the control data may include configuration information on at least one of notification sound, vibration, screen on/off, and screen lock. When the user changes configurations for control data in the electronic device 220, the processor may generate control data for the corresponding information and transmit the data to the external device 210.

Figure 3:
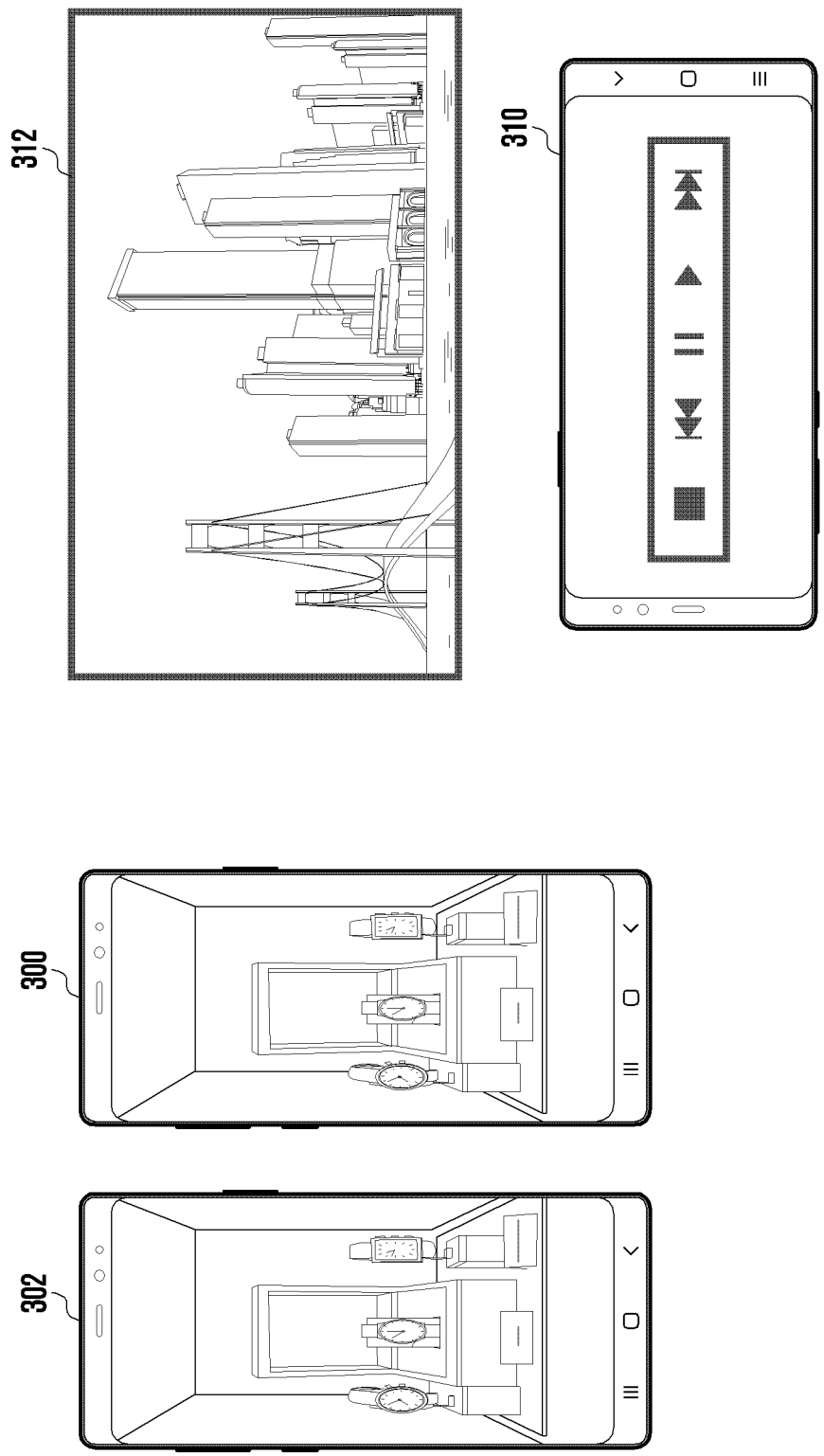
FIG. 3 is a diagram illustrating screen reconfiguration for each type of external device according to an embodiment of the disclosure.

FIG. 3 is a diagram illustrating screen reconfiguration for each type of external device according to an embodiment of the disclosure.

Referring to FIG. 3, a processor may establish an extension view connection with a plurality of external devices. The processor may identify item attribute values of the application and generate view data for each type of external device. For example, the processor may generate first view data for a smartphone 302 and second view data for a tablet 312. The types of items included in the first view data and the second view data may be different. The processor may determine which view data including which item is generated according to each external device based on at least one of the application configurations and the user configurations.

According to various embodiments of the disclosure, the processor may transmit view data for a screen mirroring the execution screen of an electronic device 300 to an external device 312. For example, when transmitting and sharing a file displayed on the electronic device 300 to the smartphone 302, the processor may generate an extension view layout identical to the existing view layout and transmit the same to the smartphone 302.

According to various embodiments of the disclosure, the processor may transmit only a part of the execution screen of an electronic device 310 to the external device 312. For example, when a video is being played on the electronic device 310, the processor may transmit view data for the video screen excluding an operation menu to the external device 312 to view on a larger screen. The view data for the operation menu may include view data including a play button, a pause button, a fast-forward button, and a back button.

Figure 4:
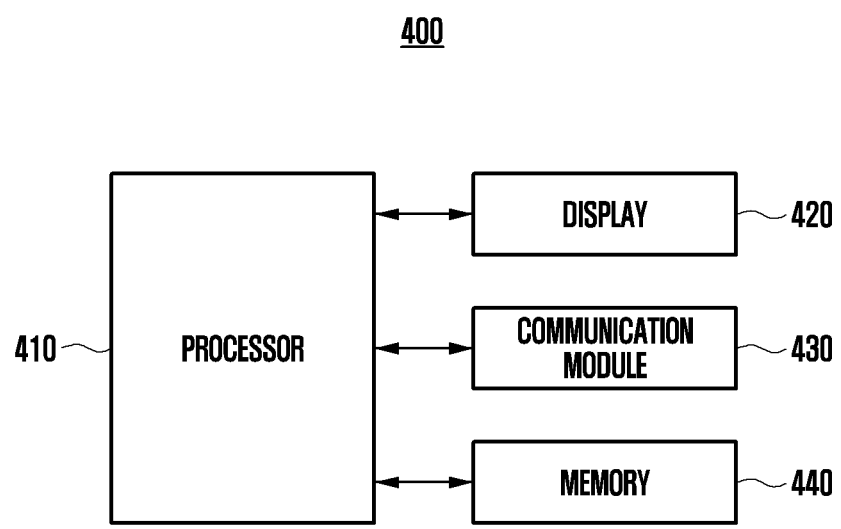
FIG. 4 is a block diagram of an electronic device according to an embodiment of the disclosure.

FIG. 4 is a block diagram of an electronic device according to an embodiment of the disclosure.

Referring to FIG. 4, an electronic device 400 may include a display 420, a communication module 430, a processor 410, and a memory 440, and some of the components illustrated in various embodiments may be omitted or replaced. The electronic device 400 may further include at least some of the configurations and/or functions of the electronic device 101 of FIG. 1. At least some of the components of the illustrated (or not illustrated) electronic device 400 may be operatively, functionally, and/or electrically connected to each other.

According to various embodiments of the disclosure, the display 420 may display various images under the control of the processor 410. The display 420 may be implemented as any one of a liquid crystal display (LCD), a light-emitting diode (LED) display, and an organic light-emitting diode (OLED) display, but is not limited thereto. The display 420 may be configured as a touch screen that detects a touch and/or proximity touch (or hovering) input using a part of the user's body (e.g., a finger) or an input device (e.g., a stylus pen). The display 420 may include at least some of the components and/or functions of the display module 160 of FIG. 1.

According to various embodiments of the disclosure, at least a part of the display 420 may be flexible, and may be implemented as a foldable display or a rollable display.

According to various embodiments of the disclosure, the communication module 430 may communicate with an external device through a wireless network according to the control of the processor 410. The communication module 430 may include hardware and software modules for transmitting and receiving data in a cellular network (e.g., long term evolution (LTE) network, 5G network, and new radio (NR) network) and a local area network (e.g., Wi-Fi and Bluetooth). The communication module 430 may include at least some of the components and/or functions of the communication module 190 of FIG. 1.

According to various embodiments of the disclosure, the memory 440 may temporarily or permanently store various data including a volatile memory (e.g., the volatile memory 132 of FIG. 1) and a non-volatile memory (e.g., the non-volatile memory 134 of FIG. 1). The memory 440 may include at least some of the configuration and/or functions of the memory 130 of FIG. 1, and store the program 140 of FIG. 1.

According to various embodiments of the disclosure, the memory 440 may store various instructions that may be executed by the processor 410. These instructions may include control commands, such as arithmetic and logic operations, data movement, and input/output that may be recognized by the processor 410.

According to various embodiments of the disclosure, the processor 410 may be a component capable of performing calculations or data processing related to control and/or communication of each component by operatively, functionally, and/or electrically connected to each component (e.g., the display 420, the communication module 430, the processor 410, and the memory 440) of the electronic device 400. The processor 410 may include at least some of the components and/or functions of the processor 120 of FIG. 1.

According to various embodiments of the disclosure, calculation and data processing functions that the processor 410 may implement on the electronic device 300 will not be limited, but hereinafter, various embodiments for reconfiguring an application execution screen of the electronic device 400 by using an external device will be described. Operations of the processor 410 to be described below may be performed by loading instructions stored in the memory 440.

According to various embodiments of the disclosure, the processor 410 may determine an item in an application execution screen to be transmitted to an external device. According to an embodiment of the disclosure, the item to be transmitted to the external device may be configured on an application. For example, a game application developer may set an item that may be transmitted to an external device in a resource file when an application is generated. The processor 410 may identify the resource file of the application and determine the item determined in the resource file as the item to be transmitted to the external device.

According to various embodiments of the disclosure, the resource file may be generated in the form of a markup language (e.g., xml), and may include a filter condition including at least one of device type, screen size, whether only my account device is supported, and whether a pen is supported. According to an embodiment of the disclosure, the processor may directly edit file text based on a user input or visually arrange and edit view items by using a platform development tool. For example, an example of the resource file in which the device type is configured as a smartphone and the visibility is configured as optional is illustrated in Table 1 below.

TABLE 1

| Android Application View Layout File |
| --- |
| <LinearLayout<br>  xmlns:android="http://schemas.android.com/apk/res/android"<br>  android:orientation="vertical" android:layout_width="match_parent"<br>    android:layout_height="wrap_content"<br>  android:background="#A700D48D"<br>  android:extensionView="true"<br>  android:extensionView_deviceType="phone"<br>  android:extensionView_visibility="optional"><br>    <TextView<br>      android:id="@+id/device_id"<br>      android:layout_width="match_parent"<br>      android:layout_height="20dp" |

TABLE 1-continued

Android Application View Layout File

```
    android:text="device id : bluetooth address"/>
<TextView
    android:id="@+id/device_info"
    android:layout_width="match_parent"
    android:layout_height="wrap_content"
    android: text="device name : contact name"/>
```

According to various embodiments of the disclosure, the processor 410 may configure an existing view layout, an extension view layout, and a modified view layout based on the determined item. The existing view layout may be the execution screen of the current application. The extension view layout may be a layout in which items to be transmitted to the external device are arranged among items of the existing view layout. The modified view layout may be a screen on which an application is executed in the electronic device 400 after an item is transmitted to the external device. For example, the existing view layout may include a first item, a second item, a third item, and a fourth item, and the user may determine to transmit the first item and the second item to the external device, but the second item may be determined to be also displayed on the electronic device 400. In this case, the extension view layout may include the first item and the second item, and the modified view layout may include the first item, the second item, and the third item. Arrangement of each item on the layout may be configured for each application or may be configured by the user. According to various embodiments of the disclosure, the processor 410 may generate view data based on the determined item. According to an embodiment of the disclosure, the view data may include attribute values for each item. The attribute values may include at least one of whether the extension view layout for each item is included, whether the modified view layout for each item is included, filter conditions, and account information. According to an embodiment of the disclosure, the processor 410 may generate view data for each external device. For example, first view data for a smartwatch, second view data for a tablet PC, and third view data for a smartphone may be generated according to the attribute values of each item included in the existing view layout. View data to be transmitted may vary depending on an external device to which the processor 410 performs a communication connection.

According to various embodiments of the disclosure, the processor 410 may switch to a view selection mode based on a user input. According to an embodiment of the disclosure, the processor 410 may determine an item to be transmitted to an external device based on the user input in the view selection mode. The processor 410 may display a menu for switching to the view selection mode on the display 420. The processor 410 may switch the running application to the view selection mode based on the user input.

According to an embodiment of the disclosure, the processor 410 may insert a visual effect into at least one area including an item transmittable to an external device in the view selection mode. For example, an outline of an area including the item transmittable to the external device may be displayed as a border, or an item transmittable to the external device may be displayed in a different color. For example, when the first item and the second item may be transmitted to the external device on the application execution screen, the processor 410 may insert a border effect into the outline of the area including the first item and the outline of the area including the second item, respectively, or insert a border effect into the outline of the area including both the first item and the second item.

According to various embodiments of the disclosure, the processor 410 may display at least one of the existing view layout, the extension view layout, the modified view layout, and an image of the external device on the display 420 in the view selection mode. According to an embodiment of the disclosure, the processor 410 may vertically (or horizontally) arrange at least one of the existing view layout, the extension view layout, the modified view layout, and an image of the external device on the display 420 in the view selection mode.

According to another embodiment of the disclosure, the processor 410 may determine at least one selected item based on a user input as an item to be transmitted to an external device. According to an embodiment of the disclosure, the processor 410 may provide a selection completion menu on one side of the display 420 in the view selection mode. For example, when the user decides to transmit the first item included in the existing view layout to the external device, the first item may be included in the extension view layout and the first item may be removed in the modified view layout. The processor 410 may determine to transmit the first item to the external device based on a user input (e.g., touch or click) on the selection completion menu. According to an embodiment of the disclosure, the processor 410 may provide a split bar through which a user may enlarge a desired layout. For example, when the existing view layout and the extension view layout are arranged vertically, the split bar may be disposed in the middle of the existing view layout and the extension view layout. When the user touches and drags the split bar upward, the size of the layout disposed above the split bar may be reduced, and the layout located below the split bar may be enlarged.

According to an embodiment of the disclosure, the processor 410 may determine which of the extension view layout and the modified view layout to include each item based on the number of times a user has touched each item. For example, the processor 410 may select an item to be displayed in the extension view layout when the user touches the item once, may select an item to be displayed in both the extension view layout and the modified view layout when the user touches the item twice, and may determine to cancel the selection of the corresponding item when the user touches the item three times. For example, when the user touches the first item once, the second item twice, and the third item three times among the items included in the existing view layout, the processor 410 may display the first item and the second item in the extension view layout, and the second item and third item in the modified view layout.

According to various embodiments of the disclosure, the processor 410 may search device information of at least one external device. The device information may include at least one of a device type of an external device, account information, hardware information, operating system information, and status information. According to an embodiment of the disclosure, the processor may determine whether to search for an external device. For example, when an external device logged in with the same account information, the processor may search for the external device. According to an embodiment of the disclosure, when searching for an external device, the processor may configure a scan filter (e.g., a BLE MAC address, a service ID, and a manufacturer ID) to search for only a desired external device or service. The processor 410 may search for a plurality of external devices, obtain device information of each external device, and store the information in the memory 440.

According to various embodiments of the disclosure, the processor 410 may select an external device capable of being connected to an extension view based on device information acquired from the external device and a filter condition. According to an embodiment of the disclosure, the filter condition may include at least one of device type, screen size, whether only devices with the same account are supported, whether a pen is supported, and operating system information. For example, the first application may have a filter condition supporting only a tablet PC, a screen of 10 inches or larger, and the same account. The processor 410 may select an external device that satisfies a corresponding filter condition from among neighboring external devices.

According to various embodiments of the disclosure, the processor 410 may display an external device that meets the filter condition on the display 420. The processor 410 may receive information on filter conditions from a plurality of external devices and determine at least one external device that meets the filter conditions. The processor 410 may display at least one external device that meets the filter conditions on the display 420 as at least one of a graphic object (icon) and a selection menu. For example, when the external device that meets the filter conditions is a smart-watch or tablet, the graphic object indicating the smartwatch and the tablet may be displayed on the display 420 or a phrase indicating the external device (e.g., the smart watch, the tablet PC) may be displayed.

According to various embodiments of the disclosure, the processor 410 may transmit an extension view connection request to an external device based on a user input. For example, the processor may transmit the extension view connection request to the external device corresponding to the graphic object touched by the user among graphic objects displayed on the display 420.

According to various embodiments of the disclosure, the processor 410 may establish an extension view connection with an external device. According to an embodiment of the disclosure, the electronic device 400 may connect the extension view to the external device through at least one of a wireless network, a wired network, and a wireless display connection standard. For example, the electronic device 400 may connect the extension view to the external device through a Miracast method.

According to various embodiments of the disclosure, the processor 410 may transmit view data for transmission to an external device. The processor 410 may utilize the established extension view connection to convert the generated view data into view data for transmission so as to be transmitted to the external device. The view data for transmission may include information for configuring an extension view layout in the external device. The external device may receive view data for transmission and configure the extension view layout.

According to various embodiments of the disclosure, the processor 410 may receive view event information from an external device. When a user input to the external device occurs, the external device may generate view event information for the input. For example, when a user touches a pause button among at least one button included in the extension view layout of a video playback application, the external device may generate view event information by recognizing the user input on the pause button. The external device may transmit view event information to the electronic device 400 by using the extension view connection. The processor 410 may receive view event information and determine an operation to be performed based on the received view event information. In this case, the operation performed by the processor may be the same operation as when an event input to the external device occurs in the electronic device. For example, the processor may determine to perform an operation of temporarily stopping an image being executed in the external device.

According to various embodiments of the disclosure, the processor 410 may modify and retransmit view data to an external device based on view event information. According to an embodiment of the disclosure, the processor 410 may also modify an extension view layout displayed on an external device and a modified view layout displayed on the electronic device 400 based on view event information. For example, when a user touches the video pause button displayed on the external device, the processor 410 may receive corresponding event information from the external device and pause video reproduction. The processor 410 may modify view data to change the play icon displayed on the external device to a pause icon, and transmit the modified view data to the external device. The external device may receive the modified view data and change the icon displayed on the display 420 of the external device.

According to various embodiments of the disclosure, the processor 410 may transmit control data including configuration information for at least one of a notification sound, vibration, screen on/off, and screen lock to the external device. For example, configurations of the external device may be changed based on the user input to the display 420 of the electronic device 400. For example, when the user activates the screen lock function in the electronic device 400, the processor 410 may transmit information on activation of the screen lock function to the external device. The external device may receive the information and activate the screen lock function.

Figure 5A:
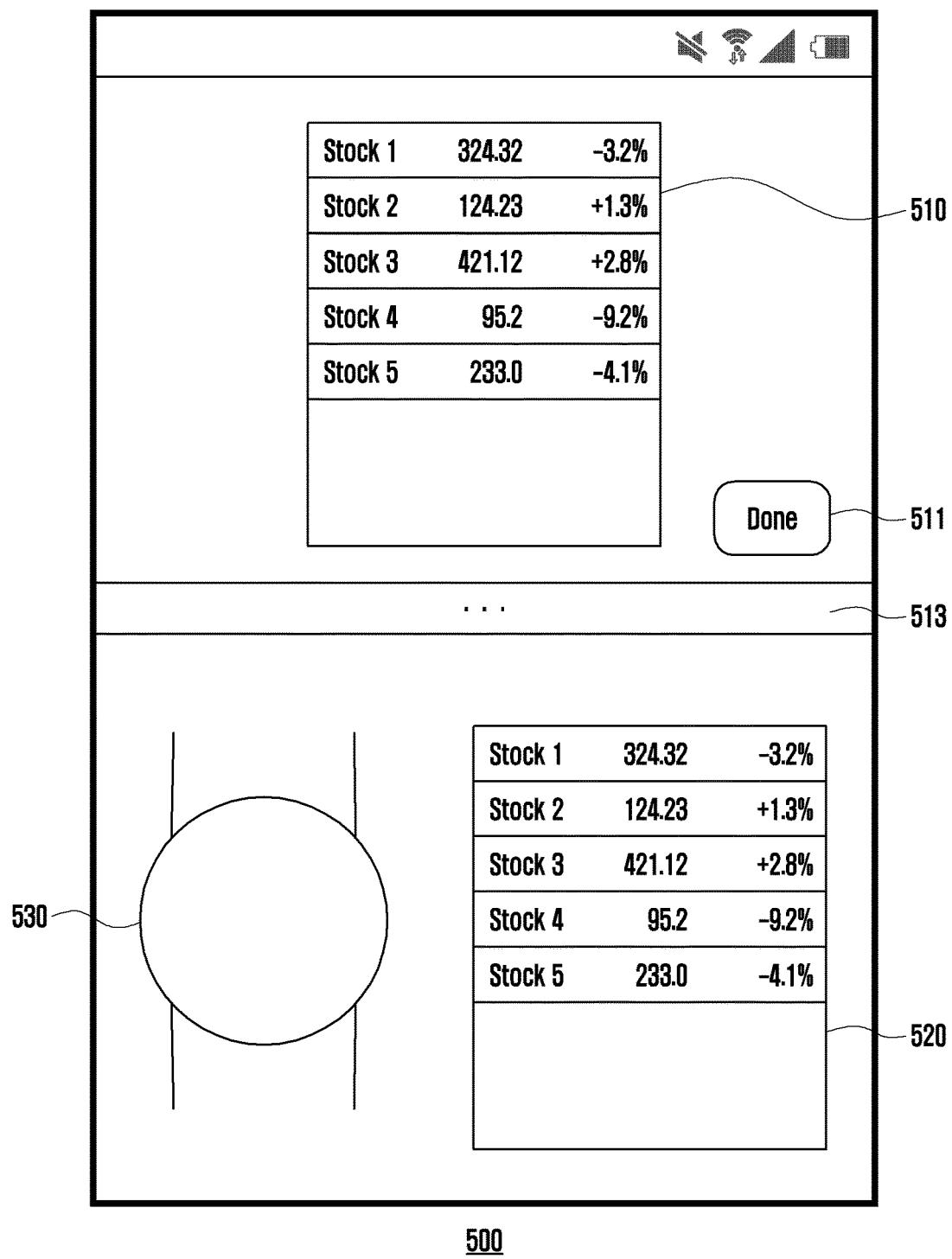
FIGS. 5A and 5B are diagrams illustrating screens for determining an item to be transmitted to an external device according to various embodiments of the disclosure.
Figure 5B:
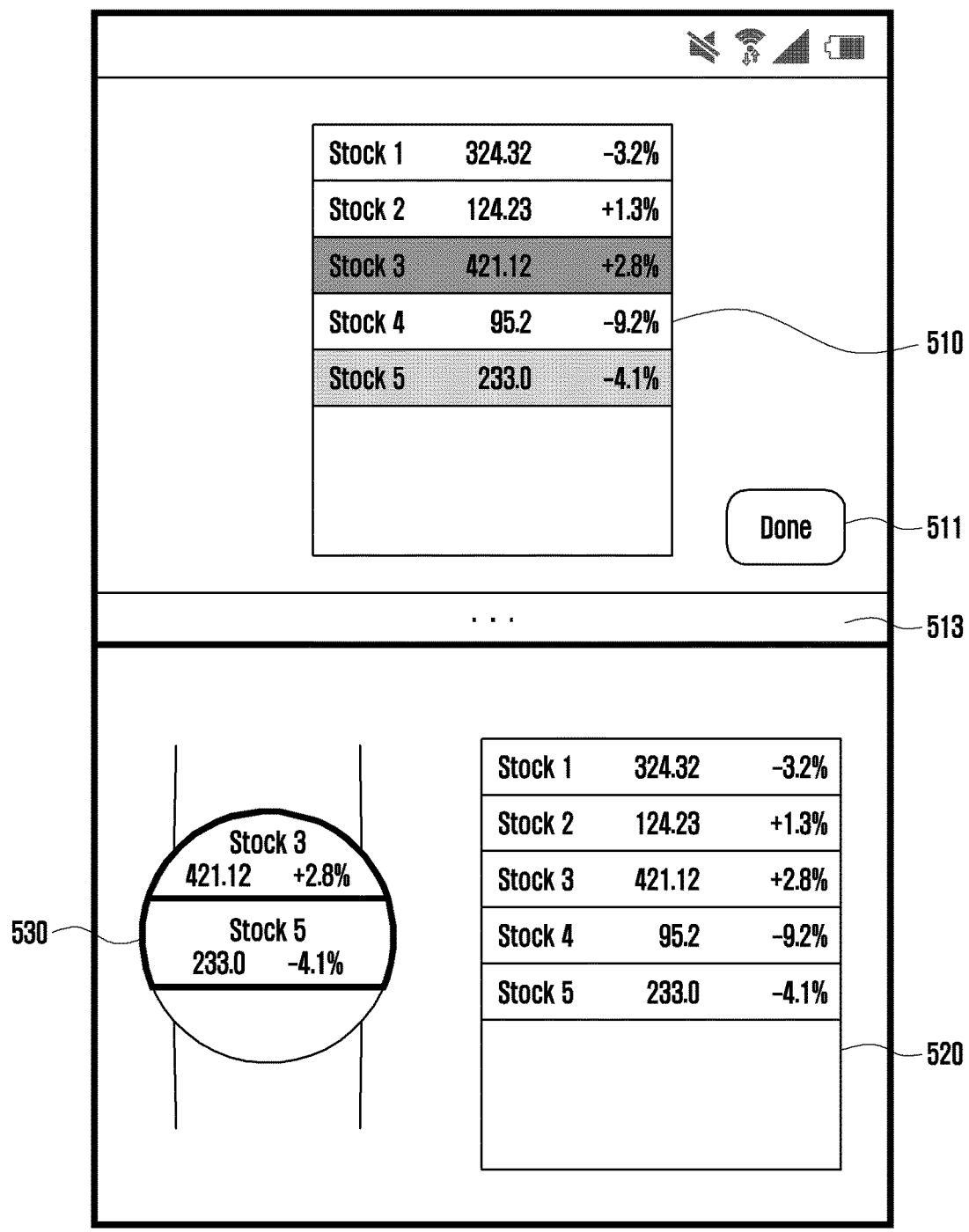

FIGS. 5A and 5B are diagrams illustrating screens for determining an item to be transmitted to an external device according to various embodiments of the disclosure.

Referring to FIG. 5A, at least one of an existing view layout 510, a modified view layout 520, an extension view layout 530, and a split bar 513 may be displayed on a screen 500 for determining the item to be transmitted to the external device. According to an embodiment of the disclosure, the extension view layout 530 may be included in an image of the external device expressed based on information of the external device and displayed together. According to an embodiment of the disclosure, a processor (e.g., the processor 410 of FIG. 4) may separately display the existing view layout 510 in the area separated by the split bar 513 when displaying the item determination screen. For example, the existing view layout 510 may be placed at the top (bottom), the modified view layout 520 and the extension view layout 530 may be placed at the bottom (top), and the split bar 513 may be placed between them to separate the areas. According to an embodiment of the disclosure, the user may adjust the size of each layout by touching and dragging the split bar 513. For example, when the user touches the split bar 513 and drags it upward, the size of the existing view layout 510 may be reduced, and the size of the modified view layout 520 and the extension view layout 530 may be expanded. According to an embodiment of the disclosure, a selection completion menu 511 may be provided on the item determination screen. When the user selects all items to be transmitted to the external device and touches the selection completion menu 511, the items to be transmitted to the external device are determined, and the processor may generate view data for corresponding items and generate a view layout based on the view data.

Referring to FIG. 5B, the extension view layout 530 may be displayed together in an image of the external device connected to the extension view. For example, the processor may provide a preview image of the extension view layout 530 actually displayed on the external device. The processor may determine an item to be transmitted to the external device based on the user input. According to an embodiment of the disclosure, as soon as the user touches an item included in the existing view layout 510, the processor may display the item touched by the user in the extension view layout 530 and display the screen 500 to be changed in the modified view layout. According to another embodiment of the disclosure, the processor may separately display the item selected by the user (e.g., color, shade) and display the item on the extension view layout 530 when the selection completion button is touched.

According to various embodiments of the disclosure, the processor may determine which of the modified view layout 520 and the extension view layout 530 to display according to the number of times the user touches each item. For example, the processor may determine that the first item is displayed only in the extension view layout 530 when the user touches the first item only once, and also displayed in the modified view layout 520 when the user touches the first item twice. The processor may initialize display of the first item when the user touches the first item three times. For example, the first item may be displayed to be included only in the existing view layout 510.

For example, the processor may transmit a part of the application screen to the smartwatch connected to the extension view. The user may decide to transmit the first item and the second item in the application to the smartwatch, touch the first item once, and touch the second item twice. The processor may display the first item in a first color and the second item in a second color in the existing view layout 510, display the first item and the second item in the extension view layout 530 appearing at the bottom of the split bar 513, and may not display the first item in the modified view layout 520.

Figure 6B:
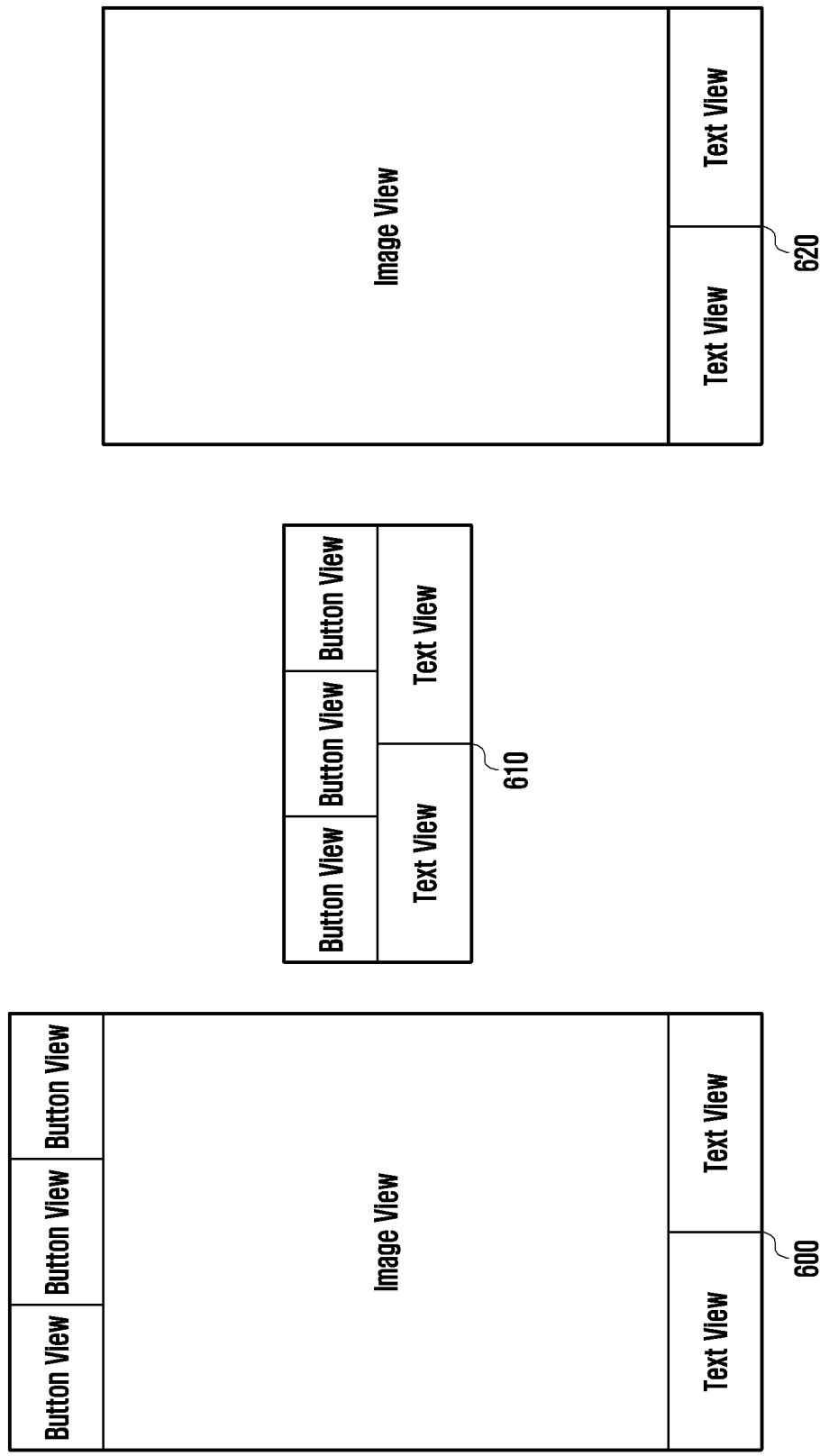

FIGS. 6A and 6B are diagrams illustrating an existing view layout 600, an extension view layout 610, and a modified view layout 620 according to various embodiments of the disclosure.

Referring to FIG. 6A, a processor (e.g., the processor 410 of FIG. 4) may generate the extension view layout 610 and the modified view layout 620 by combining each item (e.g., a button view, an image view, and a text view) included in the existing view layout 600. According to an embodiment of the disclosure, the processor may determine that an item configured to be transmitted to an external device on an application is included in the extension view layout 610.

Referring to FIG. 6B, at least some of the items of the existing view layout 600 may be included in both the extension view layout 610 and the modified view layout 620. The processor may identify and determine which layout each item belongs to in an application or may determine based on a user input.

According to an embodiment of the disclosure, the processor may determine which of the extension view layout 610 and the modified view layout 620 to include according to the number of times a user has touched each item. For example, it may be determined that the item is included in the extension view layout 610 when touched once, included in the extension view layout 610 and modified view layout 620 when touched twice, and selection is initialized when touched three times. When the user touches the button view and the text view only once, the processor may include only the button view and the text view in the extension view layout 610 and leave only the image view in the modified view layout 620, as illustrated in FIG. 6A. When the user touches the button view once and the text view twice, the processor may include the button view and the text view in the extension view layout 610 and the image view and the text view in the modified view layout 620, as illustrated in FIG. 6B.

Figure 7:
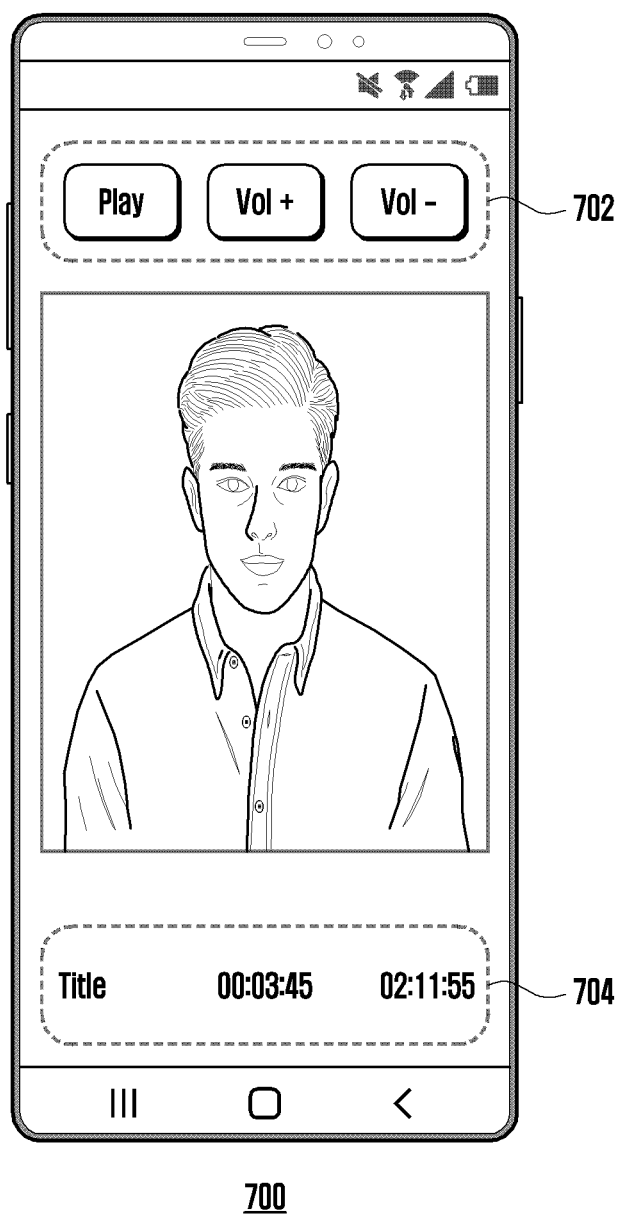
FIG. 7 is a diagram illustrating that visual effects are added to items that may be transmitted to an external device on an application execution screen according to an embodiment of the disclosure.

FIG. 7 is a diagram illustrating that visual effects are added to items that may be transmitted to an external device on an application execution screen according to an embodiment of the disclosure.

Referring to FIG. 7, a processor (e.g., the processor 410 of FIG. 4) may add visual effects to an item that may be transmitted to an external device. According to an embodiment of the disclosure, the processor may display 700 a border surrounding the outline of the item included in the extension view layout. The processor may display 700 the item that may be transmitted to the external device by painting the area including the item with a different color or by adding a shade.

For example, when a user is playing a video, a play button and a volume control button 702 located above and below the video and a status bar 704 displaying a play time may be transmitted to the external device. The processor may display that the user may transmit the item to an external device by displaying an outline of the area including the corresponding item.

According to various embodiments of the disclosure, the processor may determine at least some of items transmittable to the external device based on a user input and generate the extension view layout. For example, when the user touches some of the items displayed as the border area, the processor may determine to include the corresponding item in the extension view layout. According to an embodiment of the disclosure, whether to include each item in the extension view layout and the modified view layout may vary according to the number of times a user has touched the item. For example, when the user touches the status bar 704 twice and touches the play button and volume control button 702 only once, the processor may decide to include the status bar 704 in both the extension view layout and the modified view layout, and to include the play button and volume control button 702 only in the extension view layout.

According to various embodiments of the disclosure, the processor may receive a user input for an item transmittable to the external device and convert the item into a floating form. According to an embodiment of the disclosure, the user may transmit an extension view connection request by moving the item converted to the floating form to one side of a display (e.g., the display 420 of FIG. 4). For example, when a user long presses an item to be transmitted to the external device, the processor may convert the corresponding item into a floating form. Thereafter, when the user moves the floating item to the right edge of the display, the processor may switch to a view selection mode to transmit the corresponding item to the external device. After switching to the view selection mode, the processor may determine an item to be transmitted to the external device based on a user's selection of another item included in the existing view layout.

Figure 8:
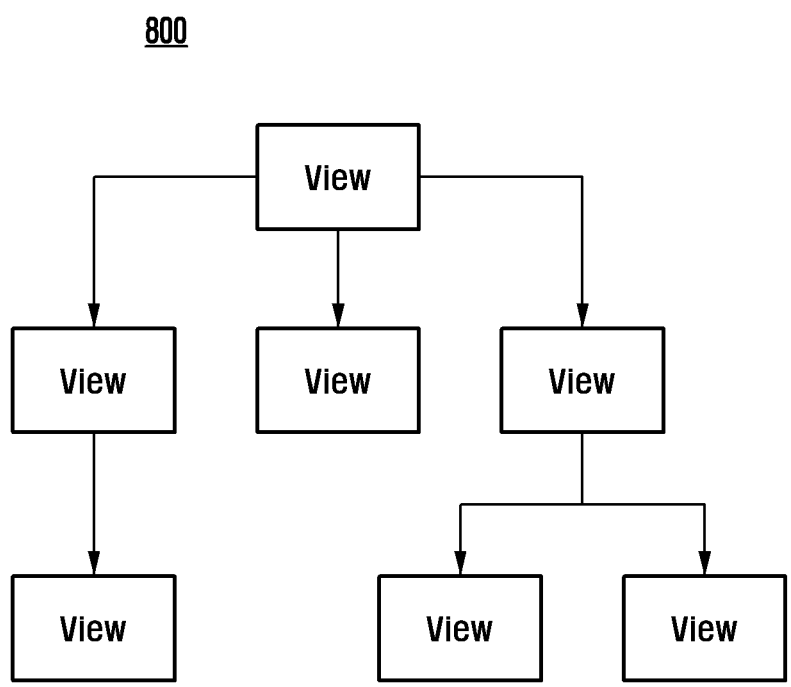
FIG. 8 is a diagram illustrating a view tree structure for storing view data according to an embodiment of the disclosure.

FIG. 8 is a diagram illustrating a view tree structure 800 for storing view data according to an embodiment of the disclosure.

Referring to FIG. 8, according to various embodiments of the disclosure, a processor (e.g., the processor 410 of FIG. 4) may store view data in the form of the view tree structure

800. Referring to FIG. 8, a UI generally has the view tree structure 800 in which each node is connected in a relationship between a parent node and a child node. A root note is located at the top, and according to an embodiment of the disclosure, each node may include information on an ID, a parent node, a child node, and a screen view. According to an embodiment of the disclosure, a node next to each node may mean a child node or a sibling node.

According to various embodiments of the disclosure, the processor may store data for views in each node. For example, view data for a first view may be stored in the root node, and view data for a second view and view data for a third view may be stored in child nodes of the root node.

According to various embodiments of the disclosure, view data for transmission generated from view data may also be configured by maintaining the view tree structure 800 in the same way, and include information on the ID, the parent node, the child node, and the screen view may be included for each node. According to an embodiment of the disclosure, each node may include information on the execution screen of the application and information indicating which items are included in the execution screen.

FIG. 9 is a diagram illustrating a menu indicating an external device that may be connected to an extension view according to an embodiment of the disclosure.

Referring to FIG. 9, a processor (e.g., the processor 410 of FIG. 4) may display an external device to which the extension view layout is transmitted on one side of a display 900 (e.g., the display 420 of FIG. 4). The external device displayed on the display 900 may be an external device that satisfies a filter condition of the electronic device. According to an embodiment of the disclosure, the processor may provide a menu 902 indicating a list of external devices, and may provide a graphic object 912 (e.g., an icon) indicating connectable external devices. The processor may determine an external device to establish an extension view connection with the electronic device based on a user input for the list menu 902 or the graphic object 912.

For example, when a tablet or smartwatch is an external device that satisfies the filter condition, the processor may provide the list menu 902 consisting of the tablet and the smartwatch on the display 900. In the list menu 902, each external device may be arranged vertically or horizontally. According to an embodiment of the disclosure, the external devices in the list menu 902 may be arranged according to at least one of an order in which communication is connected with the processor first, an order in which a distance to the electronic device is short, an order in which a screen size is large, and an order in which a user frequently uses the external devices. The processor may determine a location of the list menu 902 to be displayed in the display 900, and may generate the list menu 902 to be moved based on a user input in a floating form. The processor may determine an external device to which an extension view connection is to be performed based on a user input for each item in the list menu 902.

According to another embodiment of the disclosure, the processor may display the graphical object 912 (an icon) indicating the tablet and smartwatch. The graphic object 912 may be arranged horizontally or vertically. The processor may determine an external device to establish an extension view connection based on user input for each icon (the graphical object 912).

Figure 10:
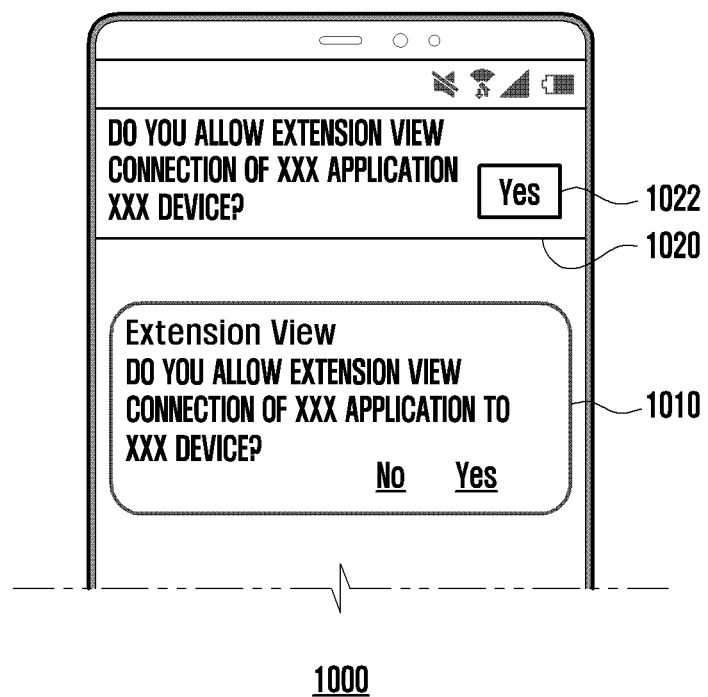
FIG. 10 is a diagram illustrating a pop-up message requesting acceptance of an extension view connection from an external device according to an embodiment of the disclosure.

FIG. 10 is a diagram illustrating a pop-up message requesting acceptance of an extension view connection from an external device according to an embodiment of the disclosure.

Referring to FIG. 10, a processor (e.g., the processor 410 of FIG. 4) may display a pop-up message 1010 on a display (e.g., the display 420 of FIG. 4) when the external device requests the extension view connection from an electronic device 1000. The processor may display the pop-up message 1010 on one side of the display, and the pop-up message 1010 may include a phrase requesting acceptance of extension view connection (e.g., Do you want to accept the extension view connection of an application to Samsung's device?), a cancel button, and a confirmation button. According to an embodiment of the disclosure, the processor may display a banner 1020 along with the pop-up message 1010 on the display. The banner 1020 may include a phrase requesting acceptance of the extension view connection (e.g., 'Do you want to accept the extension view connection of the application?') and a confirmation button 1022.

According to an embodiment of the disclosure, the processor may receive account information and accept an extension view connection request from only an external device having the same account as the electronic device 1000. For example, when the electronic device 1000 logged in with the first account receives an extension view connection request, the processor may not allow an extension view connection request from an external device logged in with the second account. According to another embodiment of the disclosure, the processor may display the pop-up message 1010 requesting connection acceptance only for an extension view connection request from an external device having different account information. When the user accepts the extension view connection request in the pop-up message 1010, the processor may establish an extension view connection with the external device.

According to another embodiment of the disclosure, the processor may not display the pop-up message 1010 requesting acceptance for an external device of the same account. According to an embodiment of the disclosure, the processor may display the pop-up message 1010 requesting acceptance for an external device of different account. For example, when the external device logged in with the same first account transmits an extension view connection request to the electronic device 1000 logged in with the first account, the processor may establish an extension view connection between the external device and the electronic device 1000 without going through a separate process.

An electronic device according to various embodiments may include a display, a communication module, a memory, and a processor operatively connected to the display, the communication module, and the memory, and the processor may obtain device information of an external device by using the communication module, determine at least one item to be transmitted to the external device from among items displayed in an application being executed on the electronic device based on the device information, generate view data of the external device including information on the determined item, and establish a communication connection with the external device so as to transmit view data for transmission.

According to various embodiments of the disclosure, the processor may generate a view layout by reconfiguring the at least one item based on the view data.

According to various embodiments of the disclosure, the processor may determine at least one item configured in the application among the items as an item to be transmitted to the external device.

According to various embodiments of the disclosure, the processor may determine at least one item selected according to a user input among the items as an item to be transmitted to the external device.

According to various embodiments of the disclosure, the processor may switch to a view selection mode based on a user input, and display at least one of an existing view layout, an extension view layout, and a modified view layout on the display in the view selection mode.

According to various embodiments of the disclosure, the processor may include the item in at least one of an extension view layout and a modified view layout according to the number of times a user has touched the item.

According to various embodiments of the disclosure, the view data may include at least one of whether an extension view layout for each item is included, whether a modified view layout for each item is included, a filter condition, and account information.

According to various embodiments of the disclosure, the filter condition may include at least one of device type, screen size, whether only devices with the same account are supported, whether a pen is supported, and operating system information.

According to various embodiments of the disclosure, the processor may determine whether the external device satisfies the filter condition, and display at least one of a graphic object indicating the external device and a selection menu on the display when the external device satisfies the filter condition.

According to various embodiments of the disclosure, the processor may communicate with the external device by using at least one of a wireless network, a wired network, and a wireless display connection standard.

According to various embodiments of the disclosure, the processor may insert a visual effect into at least one area including an item to be transmitted to the external device.

According to various embodiments of the disclosure, the device information may include operating system information of the external service, and the processor may generate view data for transmission by changing at least one attribute value in the view data based on the operating system information.

An electronic device according to various embodiments of the disclosure may include a display, a communication module, a memory, and a processor operatively connected to the display, the communication module, and the memory, and the processor may receive view event information from an external device, modify view data based on received view event information, and change the modified view data into view data for transmission to transmit the modified view data to the external device.

According to various embodiments of the disclosure, the processor may transmit configuration information for at least one of notification sound, vibration, screen on/off, and screen lock to the external device.

Figure 11:
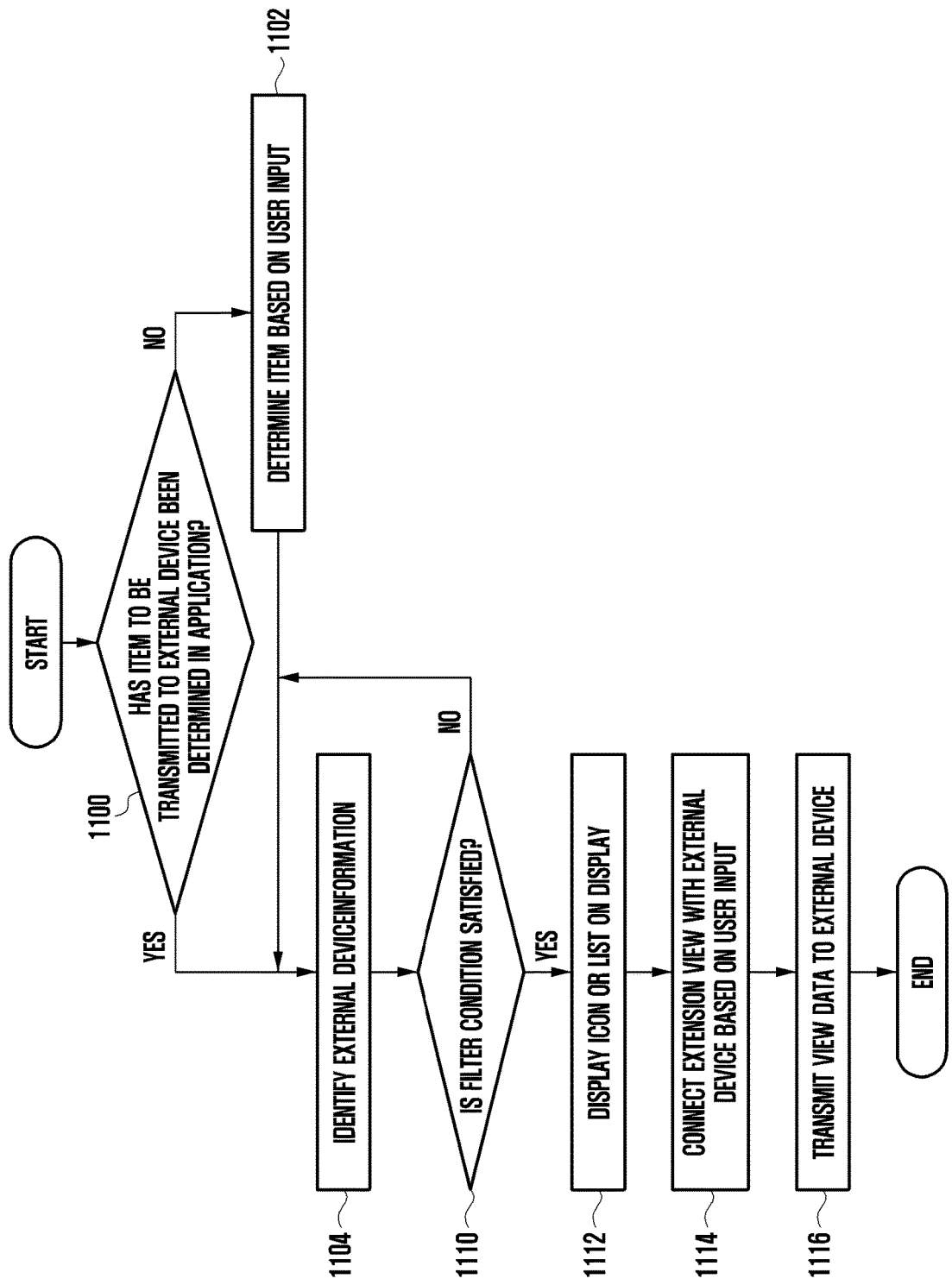
FIG. 11 is a flowchart of a method of reconfiguring an application execution screen by using an external device according to an embodiment of the disclosure.

FIG. 11 is a flowchart of a method of reconfiguring an application execution screen by using an external device according to an embodiment of the disclosure.

Referring to FIG. 11, an electronic device may determine an item to be transmitted to an external device. According to an embodiment of the disclosure, in operation 1100, the electronic device may determine whether the item to be transmitted to the external device has been determined in an application. For example, the electronic device may identify whether the item to be transmitted to the external device is configured in the application and, when it is determined, transmit the corresponding item to the external device.

According to various embodiments of the disclosure, in operation 1102, when an item to be transmitted to the external device is not determined in the application, the electronic device may determine an item based on a user input. According to an embodiment of the disclosure, the electronic device may provide a selection completion menu on one side of the display in the view selection mode. According to an embodiment of the disclosure, the electronic device may insert a visual effect into at least one area including an item transmittable to the external device in the view selection mode. For example, an outline of an area including an item transmittable to the external device may be displayed as an edge, or an item transmittable to the external device may be displayed in a different color.

According to various embodiments of the disclosure, the electronic device may determine to transmit the first item to the external device based on a user input (e.g., touch or click) on the selection completion menu. According to an embodiment of the disclosure, the electronic device may provide a split bar through which a user may enlarge a desired layout. For example, when the existing view layout and the extension view layout are arranged vertically, the split bar may be disposed in the middle of the existing view layout and the extension view layout. When the user touches and drags the split bar upward, the size of the layout disposed above the split bar may be reduced, and the layout located below the split bar may be enlarged. According to an embodiment of the disclosure, the electronic device may determine which of the extension view layout and the modified view layout to include each item based on the number of times a user has touched each item.

According to various embodiments of the disclosure, the electronic device may generate view data based on the determined item. According to an embodiment of the disclosure, the view data may include attribute values for each item. The attribute values may include at least one of whether the extension view layout for each item is included, whether the modified view layout for each item is included, filter conditions, and account information. According to an embodiment of the disclosure, the electronic device may generate view data for each external device.

According to various embodiments of the disclosure, in operation 1104, the electronic device may identify device information of the external device. The device information may include at least one of a device type of the external device, account information, hardware information, operating system information, and status information. The electronic device may receive device information transmitted by a plurality of external devices and store the same in a memory.

According to various embodiments of the disclosure, in operation 1110, the electronic device may determine whether the external device satisfies the filter condition. According to an embodiment of the disclosure, the filter condition may include at least one of a device type, a screen size, whether only devices with the same account are supported, whether a pen is supported, and operating system information. For example, the first application may have a filter condition supporting only a tablet PC, a screen of 10 inches or larger, and the same account. The electronic device may select an external device that satisfies the corresponding filter condition from among neighboring external devices.

According to various embodiments of the disclosure, in operation 1112, the electronic device may display an icon or a list of external devices connectable to the extension view on the display. The electronic device may receive information on filter conditions from a plurality of external devices and determine at least one external device that meets the filter conditions. The electronic device may display at least one external device that meets the filter conditions on the display as at least one of a graphic object (icon) and a selection menu. For example, when the external device that meets the filter conditions is a smartwatch or tablet, the graphic object indicating the smartwatch and the tablet may be displayed on the display or a phrase indicating the external device (e.g., the smart watch, the tablet PC) may be displayed.

According to various embodiments of the disclosure, in operation 1114, the electronic device may connect the extension view to the external device and based on a user input. According to an embodiment of the disclosure, the electronic device may connect the extension view to the external device through at least one of a wireless network, a wired network, and a wireless display connection standard. For example, the electronic device may connect the extension view to the external device through a Miracast method.

According to various embodiments of the disclosure, in operation 1116, the electronic device may transmit view data to an external device connected to the extension view. The electronic device may utilize the established extension view connection to convert the generated view data into view data for transmission so as to be transmitted to the external device. The view data for transmission may include information for configuring an extension view layout in the external device. The external device may receive view data for transmission and configure the extension view layout.

According to various embodiments of the disclosure, the electronic device may receive view event information from an external device. When a user input to the external device occurs, the external device may generate view event information for the input. For example, when a user touches a pause button among at least one button included in the extension view layout of a video playback application, the external device may generate view event information by recognizing the user input on the pause button. The external device may transmit view event information to the electronic device by using the extension view connection. The electronic device may receive view event information and determine an operation to be performed based on the received view event information. In this case, the operation performed by the electronic device may be the same operation as when an event occurring in the external device occurs in the electronic device.

According to various embodiments of the disclosure, the electronic device may modify and retransmit view data to an external device based on view event information. According to an embodiment of the disclosure, the electronic device may also modify an extension view layout displayed on an external device and a modified view layout displayed on the electronic device based on view event information. For example, when a user touches the video pause button displayed on the external device, the electronic device may receive corresponding event information from the external device and pause video reproduction. The electronic device may modify view data to change the play icon displayed on the external device to a pause icon, and transmit the modified view data to the external device. The external device may receive the modified view data and change the icon displayed on the display of the external device.

According to various embodiments of the disclosure, the electronic device may transmit control data including configuration information for at least one of a notification sound, vibration, screen on/off, and screen lock to the external device. For example, configurations of the external device may be changed based on the user input to the display of the electronic device. For example, when the user activates the screen lock function in the electronic device, the electronic device may transmit information on activation of the screen lock function to the external device. The external device may receive the information and activate the screen lock function.

Figure 12:
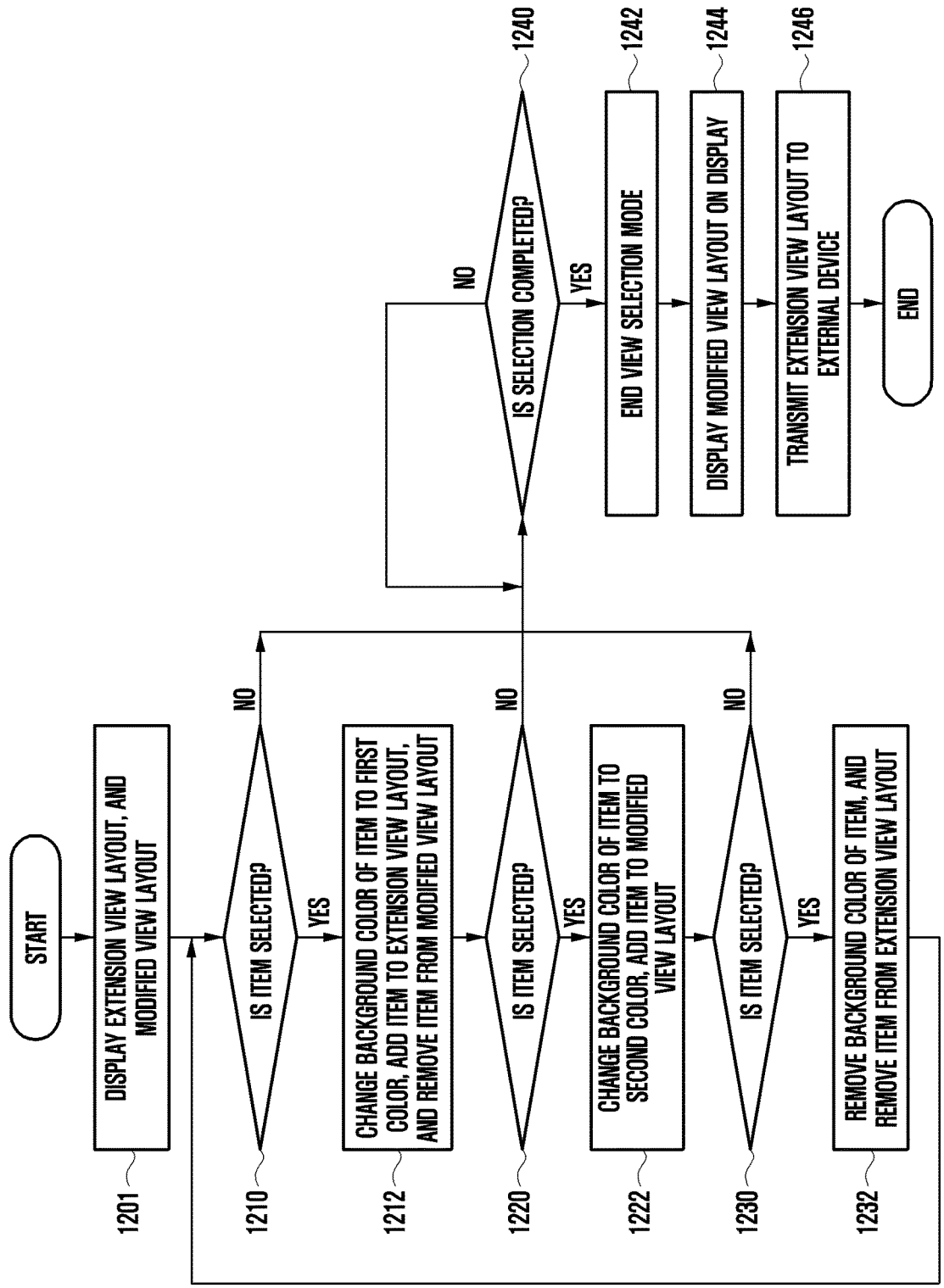
FIG. 12 is a flowchart of a method of generating view data based on user input according to an embodiment of the disclosure.

FIG. 12 is a flowchart of a method of generating view data based on user input according to an embodiment of the disclosure.

Referring to FIG. 12, according to various embodiments of the disclosure, in operation 1201, the electronic device may display an existing view layout, an extension view layout, and a modified view layout on a display upon entering a view selection mode. The electronic device may enter the view selection mode based on a user input. The electronic device may generate a layout based on the generated view data. According to an embodiment of the disclosure, the electronic device may display the existing view layout on the top, display at least one of the modified view layout and the extension view layout on the bottom, and display a split bar (e.g., the split bar 513 of FIGS. 5A and 5B) therebetween to distinguish them. According to an embodiment of the disclosure, the electronic device may also display the extension view layout within an image of the external device. According to an embodiment of the disclosure, the modified view layout initially displayed may be the same as the existing view layout. The electronic device may adjust the size of the layout by moving the split bar based on the user input. The electronic device may determine which item to display in the modified view layout and extension view layout according to the number of inputs by the user for each item. FIG. 12 is a flowchart illustrating a method of determining which item to display in the modified view layout and the extension view layout according to a change in the number of times a user has touched each item.

According to various embodiments of the disclosure, in operation 1210, the electronic device may detect a user input for an item. When the user input is detected, in operation 1212, the electronic device may change the background color of the item to the first color based on the user's selection of each item, add the corresponding item to the extension view layout, and remove the corresponding item from the modified view layout. For example, when the user touches the first item, the background color of the first item in the existing view layout may be changed to the first color, the first item may be removed in the modified view layout, and the first item may be displayed in the extension view layout. According to an embodiment of the disclosure, when an image of the external device is displayed at the bottom of the split bar, the electronic device may display the first item in the extension view layout within the image of the external device.

According to various embodiments of the disclosure, in operation 1220, the electronic device may detect a user input for an item. When the user input is detected, in operation 1222, the electronic device may change the background color of the corresponding item to the second color when the user touches each item once more, and additionally display the corresponding item in the modified view layout. For example, when the user touches the first item once more, the electronic device may change the background color of the first item to the second color in the existing view layout and additionally display the first item in the modified view layout. According to an embodiment of the disclosure, the electronic device may display the first item in the extension view layout at the bottom of the split bar and display the first item again in the modified view layout.

According to various embodiments of the disclosure, in operation 1230, the electronic device may detect a user input for an item. When the user input is detected, in operation 1232, the electronic device may remove the background color of an item from the existing view layout and remove the item from the extension view layout when the user touches each item once more. For example, when the user touches the first item once more, the electronic device may remove the first item from the extension view layout and remove the background color of the first item from the existing view layout. For example, when an item is touched three times, the electronic device may determine to return to the initial status for the corresponding item. The electronic device may determine the modified view layout and the extension view layout based on a user input for each item. According to an embodiment of the disclosure, when the user touches the first item thereafter, the electronic device may perform the same operation as when the first item is touched. For example, the operation of the electronic device for the fourth, fifth, and sixth touches on the first item may be the electronic device operations for the first, second, and third touches, respectively.

According to various embodiments of the disclosure, in operation 1240, when the user no longer selects an item, the electronic device may determine whether the selection is completed. According to an embodiment of the disclosure, the electronic device may provide a selection completion menu on one side of the display in the view selection mode. The electronic device may end layout configuration based on a user input for the selection completion menu. Until the user touches the selection completion menu, items touched once may be displayed only in the extension view layout, items touched twice may be displayed in the extension view layout and modified view layout, and items touched three times or not touched may only be displayed in the modified view layout.

According to various embodiments of the disclosure, in operation 1242, the electronic device may end the view selection mode based on a user input for the selection completion menu. The electronic device may complete the configuration of the extension view layout and modified view layout while ending the view selection mode, and generate view data to be transmitted to the external device.

According to various embodiments of the disclosure, in operation 1244, the electronic device may display the modified view layout on the display. According to an embodiment of the disclosure, the electronic device may display the modified view layout after transmitting the extension view layout to the external device.

According to various embodiments of the disclosure, in operation 1246, the electronic device may transmit the extension view layout to the external device. According to an embodiment of the disclosure, the electronic device may generate view data including information on the extension view layout, configure view data for transmission, and transmit the view data by using a wireless communication connection with the external device.

Figure 13:
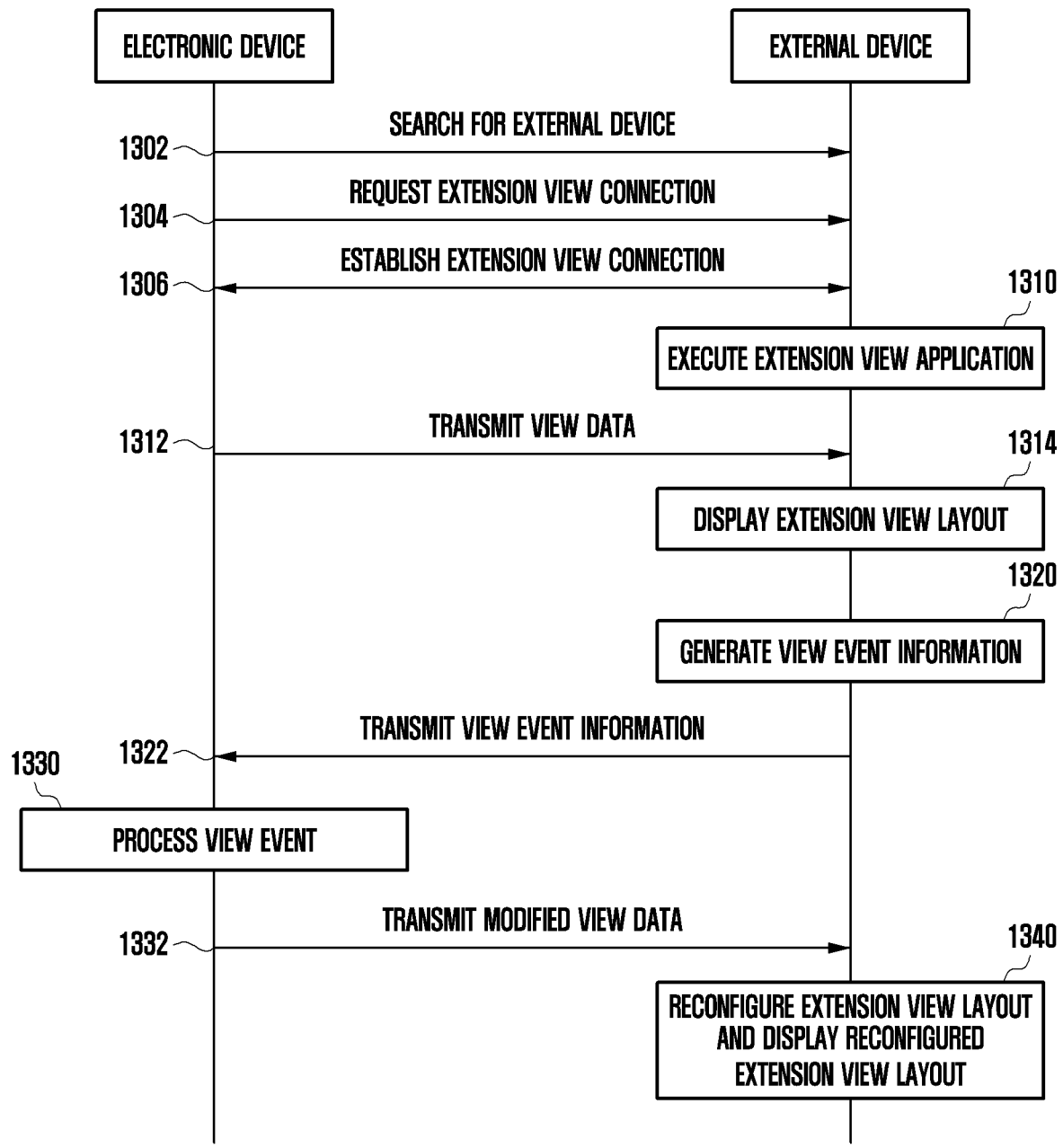
FIG. 13 is a flowchart of a method of reconfiguring a screen by wirelessly communicating with an external device according to an embodiment of the disclosure.

FIG. 13 is a flowchart of a method of reconfiguring a screen by wirelessly communicating with an external device according to an embodiment of the disclosure.

Referring FIG. 13, according to various embodiments of the disclosure, in operation 1302, the electronic device may perform a wireless communication scan when at least one of entering a view selection mode, logging into an account, and changing a status of the electronic device occurs. By using the wireless communication scan, a scan filter (e.g., a BLE MAC address, a service ID, a manufacturing ID) may be configured to search only external devices that meet the desired conditions. According to an embodiment of the disclosure, the electronic device may search for an external device that meets filter conditions through data broadcasting (e.g., BLE advertisement). The BLE packet may include at least one of service ID, manufacturing ID, account information, device status information, network status information, device type, screen size, whether a pen is supported, and operating system information. The electronic device and the external device may efficiently use the battery by adjusting the scan range based on current device conditions, such as screen on/off and remaining battery power. According to an embodiment of the disclosure, the electronic device may stop scanning when a desired external device is found.

According to various embodiments of the disclosure, in operation 1304, the electronic device may transmit an extension view connection request to the searched external device. For example, the electronic device may transmit the extension view connection request to the external device corresponding to a graphic object touched by the user on the display.

According to various embodiments of the disclosure, in operation 1306, the electronic device may establish an extension view connection with the external device by using a wireless communication connection (e.g., BT, BLE, Wi-Fi, Wi-Fi P2P, Mobile Network, secure source layer (SSL)). The electronic device may transmit/receive data with the external device by using a BLE packet. According to an embodiment of the disclosure, when a wireless communication connection has already been established for another purpose, data may be transmitted and received by using the existing communication connection without the need to establish a new communication connection. In operation 1310, the external device may execute the extension view application. The external device may communicate with the electronic device and display the extension view layout by using the extension view application.

According to an embodiment of the disclosure, the electronic device may determine the external device connectable to the extension view according to a filter condition for each item. The filter condition may include at least one of device type, screen size, whether only devices with the same account are supported, whether a pen is supported, and operating system information. The electronic device may determine an external device that satisfies the filter condition among external devices connectable through communication as the external device connectable to the extension view.

According to various embodiments of the disclosure, the electronic device may display the external device determined as an external device connectable to the extension view on one side of the display. According to an embodiment of the disclosure, the electronic device may provide at least one of a graphic object indicating external devices connectable to the extension view and a list of connectable external devices. The processor may determine the external device to establish an extension view connection based on a user input for at least one of the graphic object and the list.

According to various embodiments of the disclosure, the electronic device may determine whether account information of the electronic device and the external device match. When the account information of the electronic device and the external device match, the electronic device may establish an extension view connection between the corresponding external device and the electronic device without a separate process. When the account information of the electronic device and the external device do not match, the electronic device may display a pop-up message requesting acceptance of the extension view connection on the display. The electronic device may determine whether to establish the extension view connection with the external device based on a user input for the pop-up message.

According to various embodiments of the disclosure, in operation 1312, the electronic device may transmit generated view data to the external device. After determining the external device to be connected to the extension view, the electronic device may display the extension view layout by transmitting generated view data to the external device while displaying the modified view layout on the display.

According to various embodiments of the disclosure, the electronic device may reconfigure view data to be transmitted to the external device into view data for transmission. According to an embodiment of the disclosure, at least part of the data included in the view data may be unnecessary or incompatible data on the operating system or platform of the external device. When the attribute is unnecessary in the operating system of the external device, the electronic device may remove the attribute, or when the attribute is incompatible, the electronic device may change the attribute to other similar attribute values.

According to various embodiments of the disclosure, the external device may receive view data for transmission and change attribute values that are not supported by or are not compatible with the external device among the received view data to similar attribute values. When the operating systems of the external device and the electronic device are different, attribute values applicable to the electronic device may not be applicable to the external device. In this case, the external device may configure a view layout by changing incompatible attribute values among view data to similar attribute values.

According to various embodiments of the disclosure, in operation 1314, the external device may display the extension view layout according to the received view data. When there is a user input to the external device, in operation 1320, the external device may generate view event information.

According to various embodiments of the disclosure, in operation 1322, the electronic device may receive view event information from the external device. According to an embodiment of the disclosure, when a user input to the external device occurs, the external device may generate view event information based on a user input. When a user touches an item transmitted to the external device, the external device may receive the item and generate view event information. For example, the view event information may include at least one operation of a user's touch input, drag, and press on a button. According to an embodiment of the disclosure, the external device may reconfigure the generated view event information into view event information for transmission and transmit the same to the electronic device. For example, when the operating systems of the external device and the electronic device are different, the external device may generate view event information for transmission by changing at least some attribute values of the view event information to attribute values compatible with the electronic device.

According to various embodiments of the disclosure, in operation 1330, the electronic device may process a view event generated based on the received view event information. For example, when there is a user input for the first item from an external device, the electronic device may process view event information so that the first item performs a predetermined function. According to an embodiment of the disclosure, the electronic device may receive the view event from the external device and change attribute values that are not supported or compatible with the electronic device among the received view events to similar attribute values.

According to various embodiments of the disclosure, in operation 1332, when the view data information of the extension view area is changed as a result of processing the predetermined event function, the electronic device may transmit the changed view data to the external device. In operation 1340, the external device may reconfigure the extension view layout and display the reconfigured extension view layout.

According to various embodiments of the disclosure, the electronic device may transmit control data to the external device. According to an embodiment of the disclosure, the control data may include configuration information on at least one of notification sound, vibration, screen on/off, and screen lock. When the user changes configurations for control data in the electronic device, the electronic device may generate control data for the corresponding information and transmit the data to the external device.

Figure 14:
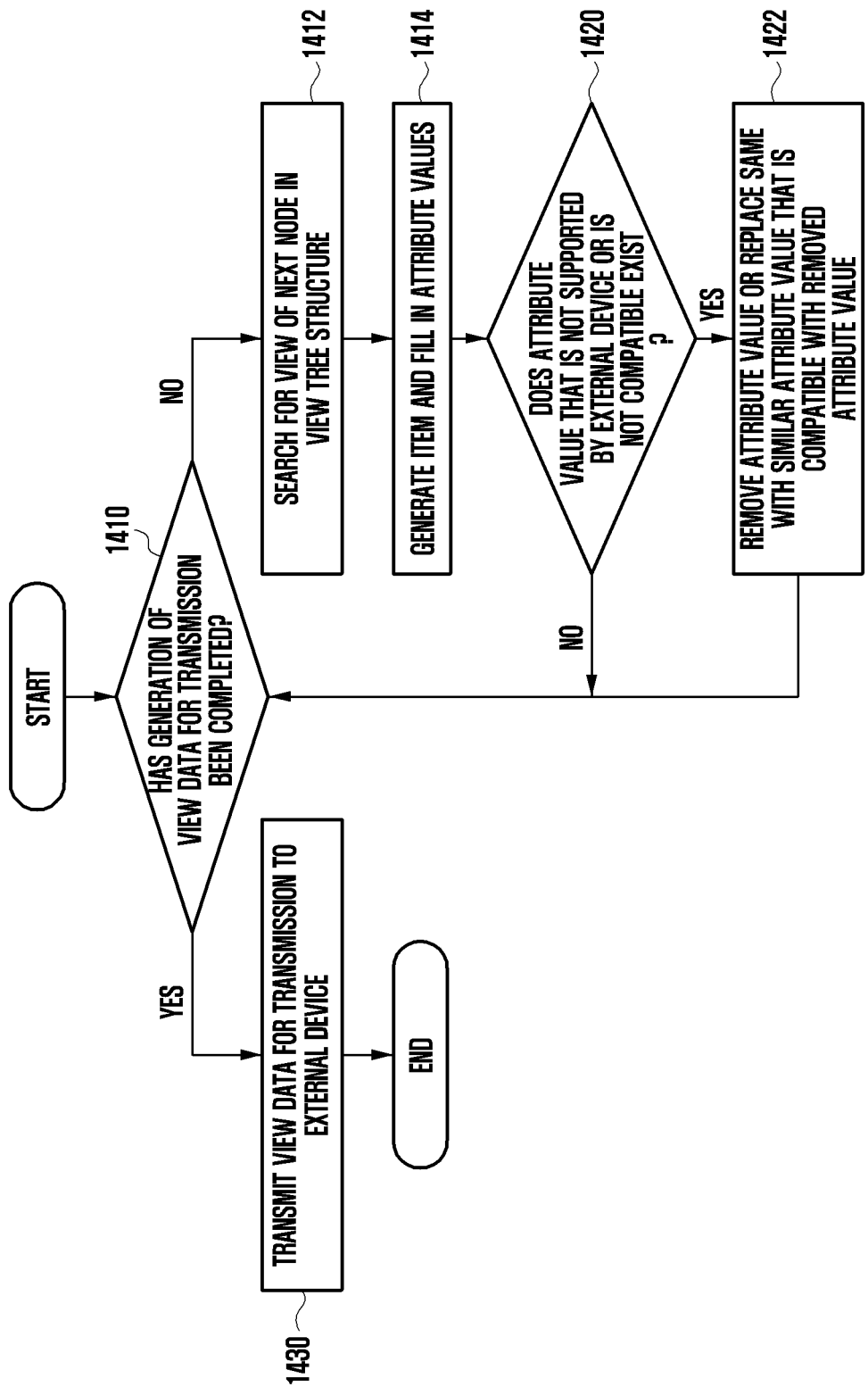
FIG. 14 is a flowchart illustrating an operation of generating and transmitting view event information for transmission to an external device according to an embodiment of the disclosure.

FIG. 14 is a flowchart illustrating a method of generating and transmitting view event information for transmission to an external device according to an embodiment of the disclosure.

Referring FIG. 14, according to various embodiments of the disclosure, in operation 1410, an electronic device may determine whether generation of view data for transmission has been completed. According to an embodiment of the disclosure, the electronic device may generate view data for transmission for the view data stored in each node of the view tree structure. The electronic device may start generating view data for transmission from the root node of the view tree structure. After generation of view data for transmission is completed for all nodes of the view tree structure, the electronic device may transmit view data in the form of a tree structure to the external device.

According to various embodiments of the disclosure, in operation 1412, the electronic device may search for a view of the next node in the view tree structure. When generation of view data for transmission is not completed, view data for the next node may be converted into view data for transmission.

According to various embodiments of the disclosure, in operation 1414, the electronic device may generate an item and fill in attribute values. According to an embodiment of the disclosure, the electronic device may generate an item to be included in each node of the tree structure and fill in an attribute value according to the item.

According to various embodiments of the disclosure, in operation 1420, the electronic device may determine whether an attribute value that is not supported by the external device or is not compatible exists. For example, attribute values supported by the electronic device may not be supported by the external device due to differences in the operating systems of the electronic device and the external device. The electronic device may determine the operating system of the external device and the electronic device based on the received device information of the external device, and determine whether an attribute value that is not supported by the external device or is not compatible exists.

According to various embodiments of the disclosure, in operation 1422, when there is an attribute value that is not supported by the external device or is incompatible, the electronic device may remove the corresponding attribute value or replace the same with a similar attribute value that is compatible with the corresponding attribute value. The electronic device may replace the attribute value with an attribute value supported by the external device so that the external device may display the extension view layout, or may replace the attribute value with a similar attribute value even if it is not the same.

According to various embodiments of the disclosure, in operation 1430, the electronic device may transmit view data for transmission to the external device. According to an embodiment of the disclosure, when generating view data for transmission for all nodes of the tree structure is completed, the electronic device may transmit the generated view data for transmission to the external device. The external device may display the extension view layout based on the received view data.

FIG. 15 is a flowchart illustrating an operation of generating and displaying an extension view layout by an external device based on view data according to an embodiment of the disclosure.

Referring to FIG. 15, according to various embodiments of the disclosure, in operation 1510, the external device may configure an extension view layout according to an operating system for all views. According to an embodiment of the disclosure, incompatible attribute values may exist due to differences in operating systems of the electronic device and the external device. The external device may configure an extension view layout by replacing incompatible attribute values with other compatible attribute values.

According to various embodiments of the disclosure, in operation 1512, the external device may search for a view of the next node in the view tree structure. The external device may generate extension view layouts for all views in the view tree structure. When the extension view layout is configured for the corresponding node, the external device may move on to the next node and perform the same operation. The next node of the corresponding node may be a child node or a sibling node.

According to various embodiments of the disclosure, in operation 1514, the external device may generate an item supported by an operating system according to a device type. According to an embodiment of the disclosure, the operating system of the electronic device and the operating system of the external device may be different. Because an item supported by the electronic device may differ from an item supported by the external device, the external device may generate an item supported by an operating system according to a device type.

According to various embodiments of the disclosure, in operation 1516, the external device may fill in attribute values of the view for each tree node. The external device may configure the extension view layout by inputting view attribute values for each generated item.

According to various embodiments of the disclosure, in operation 1520, the external device may determine whether an attribute value that is not supported or is not compatible with the operating system of the external device exists. For example, when the operating systems of the electronic device and the external device are different, attribute values supported by the electronic device but not supported by the external device may exist. Because the external device must be able to support all attribute values in order to display the extension view layout, the external device may determine whether an attribute value that is not supported or incompatible with the operating system of the external device exists.

According to various embodiments of the disclosure, in operation 1522, when there is an attribute value that is not supported by the external device or is incompatible, the external device may remove the corresponding attribute value or replace the same with a similar attribute value that is compatible with the corresponding attribute value.

According to various embodiments of the disclosure, in operation 1530, when the configuration of the extension view layout according to the operating system is completed for all views, the external device may display the completion in the extension view layout. According to an embodiment of the disclosure, when a view event occurs, the external device may modify the extension view layout by receiving feedback on view event information through a communication connection with the electronic device.

A method for utilizing an external device display of an electronic device according to various embodiments may include obtaining device information of the external device by establishing a communication connection with an external device by using a communication module, determining at least one item to be transmitted to the external device among items displayed in an application being executed on the electronic device, based on the device information, generating view data of the external device including information on the determined item, and transmitting view data for transmission to the external device.

According to various embodiments of the disclosure, the determining the item to be transmitted to the external device may include determining at least one item configured in the application among the items as an item to be transmitted to the external device.

According to various embodiments of the disclosure, the determining the item to be transmitted to the external device may include determining at least one item selected according to a user input among the items as an item to be transmitted to the external device.

According to various embodiments of the disclosure, the determining the item to be transmitted to the external device may include switching to a view selection mode based on a user input, and displaying at least one of an existing view layout, an extension view layout, and a modified view layout on the display in the view selection mode.

According to various embodiments of the disclosure, the determining the item to be transmitted to the external device may include an operation of including the item in at least one of an extension view layout and a modified view layout according to a number of times a user has touched the item.

According to various embodiments of the disclosure, the transmitting the view data for transmission to the external device may further include receiving view event information from an external device, modifying view data based on received view event information, converting the modified view data into view data for transmission, and transmitting the view data for transmission to the external device.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. An electronic device comprising:
a display;
a communication module;
a memory; and
at least one processor operatively connected to the display, the communication module, and the memory;
wherein the at least one processor is configured to:
obtain device information of an external device by using the communication module, determine at least one item to be transmitted to the external device among items displayed in an application being executed on the electronic device, based on the device information, generate view data of the external device comprising information on the at least one item, and establish a communication connection with the external device to transmit view data for transmission.

2. The electronic device of claim 1, wherein the at least one processor is further configured to generate a view layout by reconfiguring the at least one item based on the view data.

3. The electronic device of claim 1, wherein the at least one processor is further configured to determine at least one item configured in the application among the items as an item to be transmitted to the external device.

4. The electronic device of claim 1, wherein the at least one processor is further configured to determine at least one item selected according to a user input among the items as an item to be transmitted to the external device.

5. The electronic device of claim 4, wherein the at least one processor is further configured to:

switch to a view selection mode based on a user input, and display at least one of an existing view layout, an extension view layout, or a modified view layout on the display in the view selection mode.

6. The electronic device of claim 4, wherein the at least one processor is further configured to include the item in at least one of an extension view layout or a modified view layout according to a number of times a user has touched the item.

7. The electronic device of claim 1, wherein the view data comprises at least one of whether an extension view layout for each item is included, whether a modified view layout for each item is included, a filter condition, or account information.

8. The electronic device of claim 7, wherein the filter condition comprises at least one of a device type, a screen size, whether only devices with a same account are supported, whether a pen is supported, or operating system information.

9. The electronic device of claim 8, wherein the at least one processor is further configured to:

determine whether the external device satisfies the filter condition, and display at least one of a graphic object indicating the external device or a selection menu on the display in case that the external device satisfies the filter condition.

10. The electronic device of claim 1, wherein the device information comprises operating system information of the external service, and wherein the at least one processor is further configured to generate view data for transmission by changing at least one attribute value in the view data based on the operating system information.

11. An electronic device comprising:

a display;

a communication module;

a memory; and at least one processor operatively connected to the display, the communication module, and the memory;

wherein the at least one processor is configured to:

receive view event information from an external device, modify view data based on received view event information, and change the modified view data into view data for transmission to transmit the modified view data to the external device.

12. The electronic device of claim 11, wherein the at least one processor is further configured to transmit configuration information for at least one of notification sound, vibration, screen on/off, or screen lock to the external device.

13. A method of utilizing an external device display of an electronic device, the method comprising:

obtaining device information of the external device by establishing a communication connection with an external device by using a communication module;

determining at least one item to be transmitted to the external device among items displayed in an application being executed on the electronic device, based on the device information;

generating view data of the external device comprising information on the at least one item; and transmitting view data for transmission to the external device.

14. The method of claim 13, wherein the determining of the at least one item to be transmitted to the external device comprises determining at least one item configured in the application among the items as an item to be transmitted to the external device.

15. The method of claim 13, wherein the determining of the at least one item to be transmitted to the external device comprises determining at least one item selected according to a user input among the items as an item to be transmitted to the external device.

16. The method of claim 15, further comprising:

switching to a view selection mode based on a user input; and displaying at least one of an existing view layout, an extension view layout, or a modified view layout on the display in the view selection mode.

17. The method of claim 15, further comprising including the item in at least one of an extension view layout or a modified view layout according to a number of times a user has touched the item.

18. The method of claim 13, wherein the generating of the view data of the external device comprises generating a view layout by reconfiguring the at least one item based on the view data.

19. The method of claim 13, wherein the view data comprises at least one of whether an extension view layout for each item is included, whether a modified view layout for each item is included, a filter condition, and account information.

20. The method of claim 19, wherein the filter condition comprises at least one of a device type, a screen size, whether only devices with a same account are supported, whether a pen is supported, and operating system information.

* * * * *